US010475144B2

(12) United States Patent
Van Hoof et al.

(10) Patent No.: US 10,475,144 B2
(45) Date of Patent: Nov. 12, 2019

(54) PRESENTING CONTEXT-BASED GUIDANCE USING ELECTRONIC SIGNS

(71) Applicant: Microsoft Technology Licensing, LLC, Redmond, WA (US)

(72) Inventors: Hubert Van Hoof, Seattle, WA (US); David M. Gray, Bellevue, WA (US); Scott E. Seiber, Medina, WA (US); David J. Brennan, Redmond, WA (US); John R. Sanders, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 15/054,166

(22) Filed: Feb. 26, 2016

(65) Prior Publication Data

US 2017/0249714 A1 Aug. 31, 2017

(51) Int. Cl.
*G06Q 90/00* (2006.01)
*G06Q 10/10* (2012.01)

(52) U.S. Cl.
CPC ............. *G06Q 90/20* (2013.01); *G06Q 10/10* (2013.01); *G06Q 10/1093* (2013.01); *G06Q 10/1095* (2013.01)

(58) Field of Classification Search
None
See application file for complete search history.

(56) References Cited

U.S. PATENT DOCUMENTS 6,961,858 B2  11/2005  Fransdonk
7,016,877 B1   3/2006  Steele et al.
(Continued)

FOREIGN PATENT DOCUMENTS

AU  2012101222 A4   6/2012
CA     2605477 A1  10/2006
(Continued)

OTHER PUBLICATIONS

Exploring user preferences for indoor navigation support through a combination of mobile and fixed displays; Taher, Faisal et al.; published in MobileHCI '11 (Year: 2011).*
(Continued)

*Primary Examiner* — Deirdre D Hatcher
(74) *Attorney, Agent, or Firm* — Rainier Patents, P.S.

(57) ABSTRACT

Computer-implemented functionality is described herein for assisting a user in interacting with an environment. In one implementation, the functionality operates by: determining that a particular user is within a prescribed proximity to an electronic sign, or will be in prescribed proximity to the electronic sign, based on sensor information provided by one or more sensors within the environment; determining an identity of the user; determining at least one destination of the user based at least on calendar information; providing directions to the destination(s), to provide unfiltered direction information; optionally filtering the unfiltered direction information with respect to restriction information (e.g., privacy information, security information, etc.), to produce filtered direction information; composing sign information based on the filtered direction information; and sending the sign information to the electronic sign for presentation by the sign.

20 Claims, 11 Drawing Sheets

(56) References Cited

U.S. PATENT DOCUMENTS

| | | |
|---|---|---|
| 7,035,650 B1 | 4/2006 | Moskowitz et al. |
| 7,069,319 B2 | 6/2006 | Zellner et al. |
| 7,098,787 B2 | 8/2006 | Miller |
| 7,375,634 B2 | 5/2008 | Sprague |
| 7,460,891 B2 | 12/2008 | Koch et al. |
| 7,600,679 B2 | 10/2009 | Kshirsagar et al. |
| 7,653,017 B2 | 1/2010 | Juylebroeck |
| 7,751,829 B2 | 7/2010 | Masuoka et al. |
| 7,991,843 B2 | 8/2011 | Guo et al. |
| 8,040,219 B2 | 10/2011 | Haartsen et al. |
| 8,259,719 B2 | 9/2012 | Sharma et al. |
| 8,284,061 B1 | 10/2012 | Dione |
| 8,452,353 B2 | 5/2013 | Crawford |
| 8,618,984 B2 | 12/2013 | Lin et al. |
| 8,624,970 B2 | 1/2014 | Krobath |
| 8,670,325 B1 | 3/2014 | Hui et al. |
| 8,711,176 B2* | 4/2014 | Douris ............... H04W 4/21 345/633 |
| 8,744,750 B2 | 6/2014 | Gupta et al. |
| 8,781,716 B1 | 7/2014 | Wenneman et al. |
| 8,798,606 B2 | 8/2014 | Day |
| 8,842,815 B2 | 9/2014 | Connelly et al. |
| 8,847,754 B2 | 9/2014 | Buchheim et al. |
| 8,879,363 B2 | 11/2014 | Yonekura |
| 8,958,854 B1 | 2/2015 | Morley et al. |
| 8,959,368 B2 | 2/2015 | Lee et al. |
| 9,077,638 B2 | 7/2015 | Hui et al. |
| 9,100,435 B2 | 8/2015 | Hamilton, II et al. |
| 9,146,601 B2 | 9/2015 | Springfield et al. |
| 9,173,165 B2 | 10/2015 | Stark et al. |
| 9,185,167 B2 | 11/2015 | Connolly et al. |
| 9,195,765 B2 | 11/2015 | Russell et al. |
| 9,202,245 B2 | 12/2015 | Kostka et al. |
| 9,226,117 B2 | 12/2015 | Vos et al. |
| 9,538,459 B1 | 1/2017 | Shirriff et al. |
| 9,596,637 B2 | 3/2017 | Hansen et al. |
| 9,904,885 B2 | 2/2018 | Sengstaken, Jr. |
| 9,998,853 B2 | 6/2018 | Brennan et al. |
| 2002/0176388 A1 | 11/2002 | Rankin et al. |
| 2003/0078980 A1* | 4/2003 | Carstens ............. G06Q 10/00 709/206 |
| 2003/0119504 A1 | 6/2003 | Rankin |
| 2003/0169885 A1 | 9/2003 | Rinaldi |
| 2003/0181205 A1 | 9/2003 | Yiu et al. |
| 2004/0042434 A1 | 3/2004 | Kennedy |
| 2004/0123106 A1 | 6/2004 | D'Angelo et al. |
| 2004/0192207 A1 | 9/2004 | Ketola |
| 2004/0198425 A1 | 10/2004 | Mellone et al. |
| 2006/0287813 A1 | 12/2006 | Quigley |
| 2007/0030152 A1* | 2/2007 | Sprague ............ G06Q 10/047 340/572.1 |
| 2008/0182548 A1 | 7/2008 | Pattison et al. |
| 2008/0280624 A1 | 11/2008 | Wrappe |
| 2009/0234857 A1 | 9/2009 | Barault et al. |
| 2009/0299857 A1* | 12/2009 | Brubaker ............ G06Q 30/02 705/14.66 |
| 2010/0004005 A1 | 1/2010 | Pereira et al. |
| 2010/0013704 A1 | 1/2010 | Coutel et al. |
| 2010/0077484 A1 | 3/2010 | Paretti et al. |
| 2010/0268603 A1 | 10/2010 | Nolet et al. |
| 2011/0153773 A1 | 6/2011 | Vandwalle et al. |
| 2012/0115512 A1 | 5/2012 | Grainger et al. |
| 2013/0064142 A1 | 3/2013 | Bhow |
| 2013/0065584 A1 | 3/2013 | Lyon et al. |
| 2013/0090134 A1 | 4/2013 | Heshmati |
| 2013/0183924 A1 | 7/2013 | Saigh et al. |
| 2013/0282438 A1 | 10/2013 | Hunter et al. |
| 2013/0282538 A1 | 10/2013 | Hunter et al. |
| 2013/0297422 A1 | 11/2013 | Hunter et al. |
| 2013/0345961 A1 | 12/2013 | Leader et al. |
| 2014/0064500 A1 | 3/2014 | Lee |
| 2014/0085179 A1* | 3/2014 | Krig ................. G06F 3/147 345/156 |
| 2014/0089143 A1* | 3/2014 | Dione ............... G06Q 30/02 705/26.61 |
| 2014/0162601 A1 | 6/2014 | Kim et al. |
| 2014/0189804 A1 | 7/2014 | Lehmann et al. |
| 2014/0309806 A1* | 10/2014 | Ricci ................. B60Q 1/00 701/1 |
| 2014/0364100 A1 | 12/2014 | Marti et al. |
| 2014/0368161 A1 | 12/2014 | Leabman et al. |
| 2015/0031388 A1 | 1/2015 | Chatterjee et al. |
| 2015/0045068 A1* | 2/2015 | Soffer ............... G01C 21/20 455/456.3 |
| 2015/0050977 A1 | 2/2015 | Omar |
| 2015/0084838 A1* | 3/2015 | Chang ............... G06F 3/1454 345/2.1 |
| 2015/0088603 A1 | 3/2015 | Romero et al. |
| 2015/0100326 A1 | 4/2015 | Kowalkiewicz et al. |
| 2015/0110259 A1 | 4/2015 | Kaye et al. |
| 2015/0111552 A1 | 4/2015 | Kaye et al. |
| 2015/0123770 A1 | 5/2015 | Jones |
| 2015/0133173 A1 | 5/2015 | Edge et al. |
| 2015/0181371 A1 | 6/2015 | Steiner |
| 2015/0181531 A1 | 6/2015 | Zajac |
| 2015/0219757 A1 | 8/2015 | Boelter et al. |
| 2015/0278867 A1 | 10/2015 | Lerman et al. |
| 2015/0289207 A1 | 10/2015 | Kubo et al. |
| 2015/0341901 A1 | 11/2015 | Ryu et al. |
| 2015/0350820 A1 | 12/2015 | Son et al. |
| 2015/0358594 A1* | 12/2015 | Marshall ............ G06F 3/013 345/419 |
| 2015/0365486 A1 | 12/2015 | Kotecha et al. |
| 2016/0003637 A1* | 1/2016 | Andersen .......... G01C 21/3617 701/519 |
| 2016/0050564 A1 | 2/2016 | Niewczas et al. |
| 2016/0066156 A1* | 3/2016 | Le Grand ........... H04W 64/00 455/456.1 |
| 2016/0092160 A1* | 3/2016 | Graff ............... G01C 21/3641 704/257 |
| 2016/0095063 A1 | 3/2016 | Vigier et al. |
| 2016/0100282 A1 | 4/2016 | Pounds et al. |
| 2016/0148164 A1 | 5/2016 | Luk et al. |
| 2016/0156638 A1 | 6/2016 | Somani et al. |
| 2016/0205548 A1 | 7/2016 | Lundqvist et al. |
| 2016/0260296 A1 | 9/2016 | Shirriff et al. |
| 2016/0316362 A1 | 10/2016 | Ding |
| 2017/0094445 A1 | 3/2017 | Shanmugam et al. |
| 2017/0251340 A1 | 8/2017 | Sanders et al. |
| 2017/0289794 A1 | 10/2017 | Gray et al. |

FOREIGN PATENT DOCUMENTS

| | | |
|---|---|---|
| CN | 102474507 A | 5/2012 |
| EP | 2449502 A1 | 5/2012 |
| EP | 2456238 A1 | 5/2012 |
| WO | 2009/070415 A1 | 6/2009 |
| WO | 2013/009815 A2 | 1/2013 |
| WO | 2015/049660 A1 | 4/2015 |
| WO | 2015/104199 A1 | 7/2015 |
| WO | 2015101298 A1 | 7/2015 |
| WO | 2015192895 A1 | 12/2015 |

OTHER PUBLICATIONS

Smart Signs: Showing the way in Smart Surroundings; Lijding, Maria et el.; 2006 (Year: 2006).*

"10 Awesome Things You Can do today with iBeacons", published Dec. 2013, available at<<http://blog.twocanoes.com/post/68861362715/10-awesome-things-you-can-do-today-with-ibeacons>>, 19 pages.

"iBeacon for the Enterprise: Facilitating a Rich Productive Workplace", published Feb. 1, 2015, available at<<http://apsima.com/blog/ibeacon-for-the-enterprise/>>, 3 pages.

"Turning Your Mobile Apps into One Context-Aware Data Collection Hub", published Feb. 9, 2015, available at <<http://www.beaconcube.com/>>, 8 pages.

Conte et al., "BlueSentinel: a first approach using iBeacon for an energy efficient occupancy detection system", Proceedings of the 1st ACM Conference on Embedded Systems for Energy-Efficient Buildings, Nov. 5, 2014, 10 pages.

(56) References Cited

OTHER PUBLICATIONS

Dunn, Zach, "Ideas for Using Beacons in the Office", published Sep. 17, 2015, available at <<https://robinpowered.com/blog/using-ibeacons-in-the-office-for-work/>>, 6 pages.
Dunn, Zach, "Using iBeacons to Sense Presence", published Sep. 12, 2015, available at <<https://robinpowered.com/blog/using-ibeacons-to-detect-presence-in-a-room/>>, 10 pages.
Katsaros et al., "Wireless Information Highways", Proceedings of IGI, published Dec. 31, 2004, 2 pages.
Kolodziej et al., "Local Positioning Systems: LBS Applications and Services", Publication of CRC Press, May 10, 2006, 1 page.
Leddy, Patrick, "10 Things about Bluetooth Beacons You Need to Know", published Jul. 24, 2015, available at<<http://academy.pulsatehq.com/bluetooth-beacons>>, 21 pages.
Murell, Dan, "The Connected Office: What Does IoT Mean for the Workplace?", published Nov. 3, 2015, available at <<http://www.mutualmobile.com/posts/the-connected-office-what-does-iot-mean-for-the-workplace>>, 3 pages.
Pering, et al., "CoolSpots: Reducing the Power Consumption of Wireless Mobile Devices with Multiple Radio Interfaces," in Proceedings of the 4th International Conference on Mobile Systems, Applications and Services, Jun. 19, 2006, 13 pages.
Supeala, Doru, "Wayfinder: Indoors Routing Guided by Beacons", published Nov. 25, 2015, available at <<http://www.onyxbeacon.com/wayfinder-indoors-routing-guided-by-beacons/>>, 8 pages.
Wood, Becki, "Latest News, Views and Insights from the Purple WiFi Team", published Dec. 8, 2014, available at <<http://www.purplewifi.net/wifi-or-beacons-for-location-based-services/>>, 8 pages.
International Search Report and Written Opinion dated Apr. 19, 2017 from PCT Patent Application No. PCT/US2017/018026, 15 pages.
Non-Final Office Action dated Mar. 6, 2017 from U.S. Appl. No. 15/089,327, 19 pages.
Applicant-Initiated Interview Summary dated Apr. 19, 2017 from U.S. Appl. No. 15/089,327, 3 pages.
Lijding, et al., "Smart Signs: Showing the way in Smart Surroundings," available at <<http://doc.utwente.nl/65597/1/Lijding-SmartSigns.pdf>>, Technical Report No. TR-CTIT-06-20, University of Twente, Enschede, Netherlands, 2006, 18 pages.
Rye, et al., "Indoor Pedestrian Navigation Based on Hybrid Route Planning and Location Modeling," in Proceedings of the 10th International Conference on Pervasive Computing, 2012, 18 pages.
Chang, et al., "Autonomous Indoor Wayfinding for Individuals with Cognitive Impairments," in Journal of NeuroEngineering and Rehabilitation, 2010, 20 pages.
Kray, et al., "Towards a location model for indoor navigation support through public displays and mobile devices," in Proceedings of the Conference on Mobile Interaction with the Real World, 2008, 5 pages.
Sharma, "Direction Finding Signage System using RFID for Healthcare Applications," in Proceedings of the International Conference on BioMedical Engineering and Informatics, vol. 1, 2008, 5 pages.
Kray, et al., "Adaptive Navigation Support with Public Displays," in Proceedings of the 10th International Conference on Intelligent User Interfaces, 2005, 4 pages.
Audio Spot Light, available at <<https://holosonics.com/content/6Technology>>, product page, Holosonic Research Labs, Inc., Watertown, Massachusetts, accessed on Feb. 15, 2016, 7 pages.
"Lechal features," available at <<http://www.lechal.com/features.html>>, product page, Ucere Technologies Pvt. Ltd, Telangana, India, 9 Pages.
"Floor Sensor Analytics, smartest way to measure foot traffic," available at <<http://www.scanalyticsinc.com/>>, product page, Scanalytics Inc., Milwaukee, Wisconsin, accessed on Feb. 15, 2016, 5 pages.
"SensFloor®—large-area sensor system," available at <<http://www.future-shape.com/en/technologies/23>>, product page, Future Shape, Höhenkirchen-Siegertsbrunn, Germany, accessed on Feb. 15, 2016, 4 pages.
"Sit smart for a healthy body and mind," available at <<http://darma.co/>>, product page, Darma Inc., Palo Alto, California, accessed on Feb. 15, 2016, 5 pages.
"Introducing the Nymi Band™," available at <<https://www.nymi.com/the-nymi-band/>>, product page, Nymi Inc.,Toronto, Canada, accessed on Feb. 15, 2016, 10 pages.
"Meet Everykey, the Master Key to your Phone, Laptop, Website Accounts, and more," available at <<https://everykey.com/>>, product page, Everykey Inc., Cleveland, Ohio, accessed on Feb. 15, 2016, 13 pages.
"Make your life simpler," available at <<http://www.endlessid.com/>>, product page, EndlessID LLC, Hallandale Beach, Florida, accessed on Feb. 15, 2016, 1 page.
"A smarter way to run," available at <<http://www.sensoriafitness.com/>>, product page, Sensoria Inc., Redmond, Washington, accessed on Feb. 15, 2016, 8 pages.
"Under Armour Launches a Suite of Connected Fitness Products, Changing the Way Athletes Live," available at <<http://www.prnewswire.com/news-releases/under-armour-launches-a-suite-of-connected-fitness-products-changing-the-way-athletes-live-300199284.html>>, PR Newswire, Jan. 5, 2016, 3 pages.
"The Isowalk SmartCane: Clinical Visibility for Gait," available at <<http://isowalk.com/>>, product page, Isowalk, Inc., Los Angeles, Califronia, accessed on Feb. 15, 2016, 3 pages.
Sawers, Paul, "Lenovo demos new smart shoes with a screen that displays your mood," available at <<http://venturebeat.com/2015/05/28/lenovo-demos-new-smart-shoes-with-a-screen-that-displays-your-mood/>>, VentureBeat, May 28, 2015, 5 pages.
Lee, Jason, "China's Li Ning to team up with Xiaomi on 'smart' running shoes," available at <<http://www.reuters.com/article/2015/03/16/us-li-ning-xiaomi-idUSKBN0MC0WZ20150316>>, Reuters, Mar. 16, 2015, 3 pages.
"Biometric shirts for performance improvement and sleep tracking," available at <<http://www.hexoskin.com/>>, product page, Carre Technologies inc (Hexoskin), Montreal, Canada, accessed on Feb. 15, 2016, 4 pages.
"We Are Oak," available at <<http://www.oaklabs.is/>>, product page, Oak Lab, Inc., New York, New York, accessed on Feb. 15, 2016, 6 pages.
"What will you create?," available at <<https://hellonod.com/>>, product page, Nod, Inc., Mountain View, California, accessed on Feb. 15, 2016, 6 pages.
"The world's smallest input device," available at <<http://logbar.jp/ring/en/>>, product page, Logbar Inc., Tokyo, Japan, accessed on Feb. 15, 2016, 3 pages.
Lomas, Natasha, "Fin, A Remote-Control Bluetooth Ring, Finally Launches As Neyya," available at <<http://techcrunch.com/2015/11/17/neyya/#.szd1sxr:294R>>, TechCrunch, Nov. 17, 2015, 12 pages.
"iBeacon," available at <<https://en.wikipedia.org/wiki/IBeacon>>, Wikipedia entry, accessed on Feb. 15, 2016, 7 pages.
"Eddystone (Google)," available at <<https://en.wikipedia.org/wiki/Eddystone_%28Google%29>>, Wikipedia entry, accessed on Feb. 15, 2016, 2 pages.
"Activity tracker," available at <<https://en.wikipedia.org/wiki/Activity_tracker>>, Wikipedia entry, accessed on Feb. 15, 2016, 6 pages.
"E-textiles," available at <<https://en.wikipedia.org/wiki/E-textiles>>, Wikipedia entry, accessed on Feb. 15, 2015, 5 pages.
"Wearable technology," available at <<https://en.wikipedia.org/wiki/Wearable_technology>>, Wikipedia entry, accessed on Feb. 15, 2015, 5 pages.
"Final Office Action Issued in U.S. Appl. No. 15/054,163", dated Dec. 21, 2018, 11 Pages.
"Non Final Offfce Action issued in U.S. Appl. No. 15/089,537", dated Feb. 5, 2019, 21 Pages.
"Non Final Office Action issued in U.S. Appl. No. 15/054,163", dated Jun. 14, 2018, 13 Pages.
"Final Office Action issued in U.S. Appl. No. 15/089,327", dated Jul. 17, 2017, 10 Pages.
"Non Final Office Action issued in U.S. Appl. No. 15/089,327", dated Oct. 18, 2017, 10 Pages.

(56) References Cited

OTHER PUBLICATIONS

"Final Office Action issued in U.S. Appl. No. 15/089,537", dated Jun. 29, 2018, 21 Pages.
"Non Final Office Action Issued in U.S. Appl. No. 15/089,537", dated Oct. 25, 2017, 18 Pages.
"International Search Report and Written opinion issued in PCT Application No. PCT/US2017/024643", dated Jul. 3, 2017, 14 pages.
"International Search Report and Written Opinion issued in PCT Application No. PCT/US2017/024646", dated Jun. 20, 2017, 11 Pages.
Search Report and Written Opinion for International Application No. PCT/US2017/018027, dated Apr. 6, 2017, 14 pages.
"Office Action Issued in European Patent Application No. 17708079.3", dated May 28, 2019, 6 Pages.
"Final Office Action Issued in U.S. Appl. No. 15/089,537", dated May 17, 2019, 23 Pages.

* cited by examiner

PRESENTING CONTEXT-BASED GUIDANCE USING ELECTRONIC SIGNS

BACKGROUND

Physical signs include fixed directions that guide users to common destinations. For instance, a physical sign within a corridor of an office building may provide fixed instructions that guide an employee to a nearby meeting room. A sign along the roadside may provide fixed instructions that guide a traveler to an upcoming off-ramp, and so on. While ubiquitous and generally helpful, these physical signs have shortcomings. For instance, upon encountering a sign, a person may need to study it in detail to determine whether it pertains to that person's target destination. The attention that the person directs to the physical sign may slow his or her progress through the environment, and can also pose a safety hazard. In other cases, a person may discover that no physical sign is specifically directed to his or her particular travel objectives; here, the person wastes time in studying the sign(s) without gaining any benefit therefrom.

The industry provides electronic signs having changeable messages. For instance, a municipal authority may place such an electronic sign along a roadway to alert motorists to transient conditions, such as the upcoming presence of a work crew. But these kinds of signs do not overcome the above-noted deficiencies with respect to physical signs.

SUMMARY

Computer-implemented functionality is described herein for assisting a user in interacting with an environment, e.g., by moving within the environment and performing other tasks within the environment. The environment may correspond to an indoor setting, an outdoor setting, or combination thereof. In one implementation, the functionality operates by: determining that a particular user is within a prescribed proximity to an electronic sign, or will be in prescribed proximity to the electronic sign, based on sensor information provided by one or more sensors within the environment; determining an identity of the user; determining at least one destination of the user based at least on calendar information (such as scheduled events that identify the user as an attendee); providing directions to the destination(s), to provide unfiltered direction information; filtering the unfiltered direction information with respect to restriction information (e.g., privacy information, security information, compliance information, legal information, etc.), to produce filtered direction information; composing sign information based on the filtered direction information; and sending the sign information to the electronic sign for presentation by the sign.

For example, assume that a user is moving in a building on the way to a scheduled meeting. The functionality can sense the user's presence within a prescribed proximity to an electronic sign. The functionality determines that the user is likely headed to a particular meeting room after consulting the user's calendar information. The functionality then provides unfiltered direction information that is specifically tailored to the user, e.g., by guiding the user to the meeting room. The unfiltered direction information can also include directions that guide the user to other nearby sites, such as a kitchen, a restroom, etc. The functionality can choose these other sites based on various contextual factors (such as user habit information), described herein. The functionality can present all of its gathered information in a manner that respects the applicable policies of the user, the organization of which the user is a member, and/or other impacted entities.

According to another illustrative aspect, the functionality can also provide information that indicates which meeting attendees have already arrived at the meeting location, if any. The functionality can also optionally alert other meeting attendees to the present status of the user.

In general, the electronic signs allow a particular user to efficiently and safely move through an environment, and, more generally, interact with the environment. This characteristic ensues from the fact that the signs provide relevant information to the user at a particular time and place, while minimizing the amount of low-value (irrelevant) information that is presented to the user. Moreover, the functionality presents information in such a manner that respects the privacy-related concerns (and/or other information disclosure concerns) of the user and other impacted entities.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
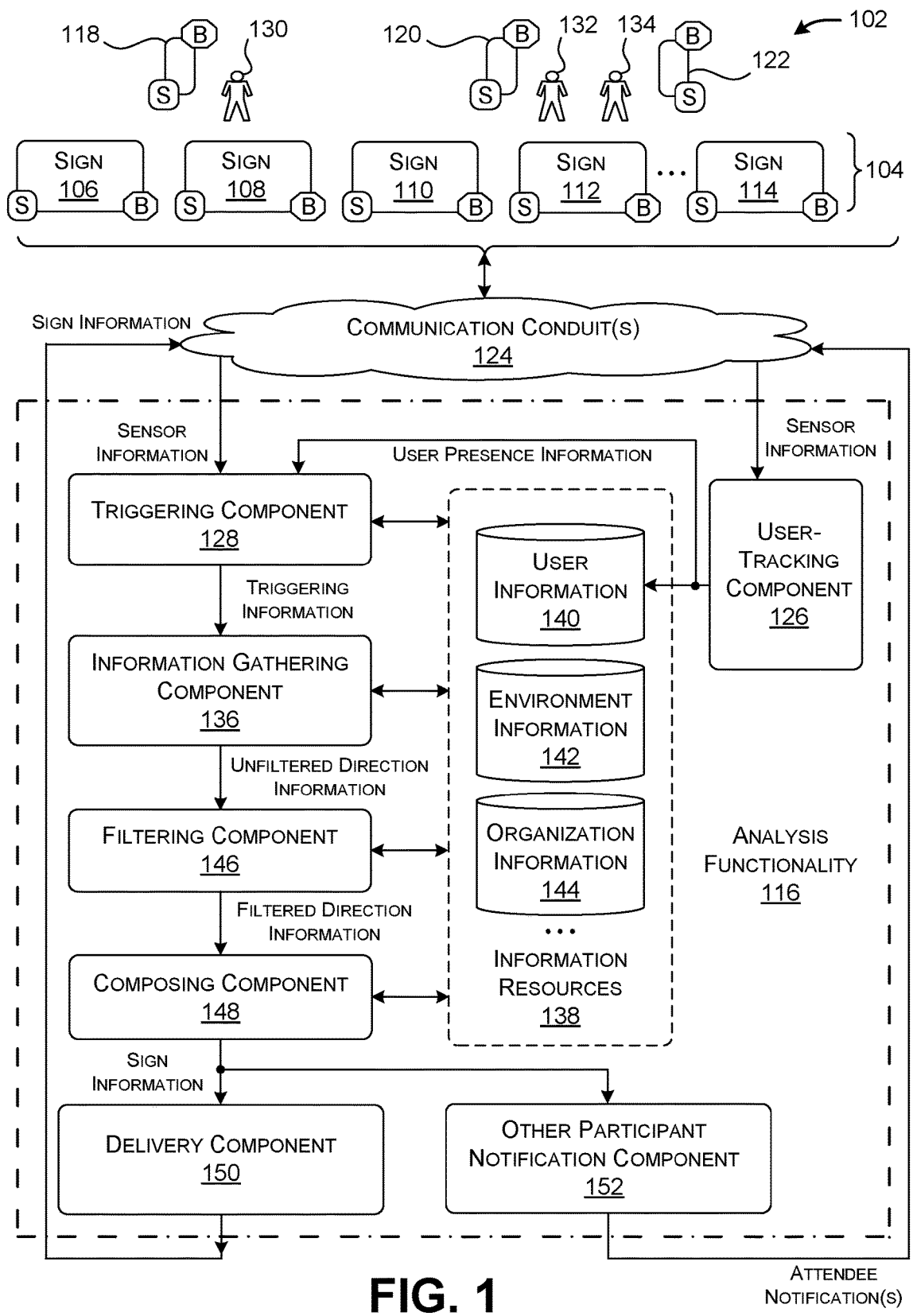
FIG. 1 shows an overview of an illustrative system for presenting context-sensitive information to users interacting with environments using electronics signs.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for providing context-sensitive information to users interacting with physical environments. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview of the System

FIG. 1 shows a system 102 for assisting a user in interacting with a physical environment, e.g., by moving within the environment and/or performing other tasks within the environment. The examples presented herein focus on the case in which the environment is an indoor space defined by one or more buildings. But more generally, the environment may correspond to any indoor space, any outdoor space, or any combination of indoor space(s) and outdoor space(s).

The system 102 includes a plurality of electronic signs 104 (e.g., electronic signs 106, 108, 110, 112, . . . , 114) at various positions within the environment. The electronic signs 104 (or more briefly, "signs") present sign information that guides users through the environment and/or instructs the user to perform other tasks within the environment. For example, the signs 104 can present direction to one or more destinations. In addition, or alternatively, the signs 104 can provide other instructions, such as information that instructs the user how to gain access to a secure area, etc.

The examples presented herein focus on the case in which the signs 104 correspond to display units that present the text-based sign information via computer-generated user interface presentations. But more generally, the signs 104 can present the sign information in any visual form, such as using any kind of light-emitting mechanisms (e.g., light emitting diodes (LEDs, etc.)). The light-emitting mechanisms can convey information via their activation states (on/off states), activation patterns, intensities, colors, spatial arrangement, etc. Alternatively, or in addition, at least some of the signs can present information in audio form, haptic form, etc., or any combination thereof.

In some cases, a sign can have a fixed physical presence in an environment, e.g., corresponding to a display unit or speaker that is mounted to a wall. In other cases, a sign does not have a fixed presence in the environment. For example, the system 102 can display sign information in audio form on a portable user device carried by the user, when the user is within a particular region of the environment. In that case, the electronic sign corresponds to the functionality of the user device which presents the sign information, and the location of that sign corresponds to the region of the environment at which the sign information is presented. To nevertheless facilitate explanation, the examples presented below will emphasize the first-mentioned scenario, e.g., in which the sign has a fixed presence in the environment.

The system 102 includes analysis functionality 116 that generates the sign information in a user-specific and context-sensitive manner. The analysis functionality 116 includes, or can be conceptualized as including, various subcomponents that perform different respective functions, to be described below. In one case, a remote computer-implemented system, such as a remote cloud-computing platform, implements all of the functions of the analysis functionality 116. That computer-implemented system can include one or more server computing devices in conjunction with other computing equipment (e.g., routing equipment, load-balancing equipment, etc.). The remote computer-implemented system can be implemented by resources provided at a single location or resources distributed over plural locations. In other implementations, the remote computer-implemented system can implement some functions of the analysis functionality 116, while various local components (such as the signs 104 themselves) can implement other functions of the analysis functionality 116.

In some implementations, the system 102 also involves the use of a plurality of user devices, such as representative user devices 118, 120, and 122. The user devices may correspond to any type of portable computing devices, such as smartphones (or other type of portable telephones), tablet-type computing devices, electronic media consumption devices, wearable computing devices, fitness devices, wireless tags or cards of various types (e.g., RFIDs, card keys, etc.), and so on. Individual users carry respective user devices as they move through the environment. In some implementations, each user device optionally plays a role in detecting that the user (who carries the user device) is located within a prescribed proximity to a sign. In addition, or alternatively, each user device optionally plays a role in providing supplemental direction information to the user. That direction information is supplemental because it supplements the direction information provided by the signs 104. A user device can present such supplemental direction information in any form or combination of forms, including visual, audio, haptic, etc. In addition, or alternatively, the system 102 can present the sign information on a user device, effectively making the user device a sign in its own right.

One or more communication conduits 124 provide a mechanism that enables the above-described components to communicate with each other. The communication conduit(s) can include any type of local area network, wide area network (e.g., the Internet), point-to-point links, or any combination thereof. The communication conduit(s) 124 can include any combination of hardwired links, wireless links, routers, gateway functionality, etc., governed by any protocol or combination of protocols.

This subsection (Subsection A.1) provides an overview of the construction and operation of the system 102. Subsection A.2 provides additional information regarding an illustrative physical environment that deploys the collection of signs 104. Subsection A.3 provides additional information regarding the analysis functionality 116. Subsection A.4 provides additional information regarding an illustrative sign. Subsection A.5 provides additional information regarding an illustrative user device. And Subsection A.6 provides additional information regarding illustrative user interface presentations that can be presented by the signs 104.

The subcomponents of the analysis functionality 116 are summarized below in generally top-to-bottom manner with reference to their depiction in FIG. 1. To begin with, a user-tracking component 126 determines the locations of users within the environment at any given time, to provide user presence information. The user-tracking component 126 can use different techniques to perform this task. In one implementation, the user-tracking component 126 detects the location of the users based on the use of a plurality of beacon-emitting mechanisms (for brevity, beacons (B)) and a plurality of beacon-sensing mechanisms (for brevity, sensors (S)), which are dispersed through the environment. As used herein, a beacon-emitting mechanism refers to any transmitting apparatus that emits an electromagnetic (wireless) probe signal (or other type of wireless signal) on a periodic basis and/or on any other basis (e.g., an event-driven basis), as governed by any protocol or combination of protocols. For example, the probe signal may correspond to a BLUETOOTH probe signal of any type (e.g., a BLUETOOTH low energy probe signal), a Wi-Fi probe signal, etc. The probe signal has a predetermined range and conveys a beacon-specific code. A beacon-emitting mechanism can generate its probe signal using any part of the electromagnetic spectrum (e.g., radio, infrared, etc.). In other cases, the beacon-emitting mechanism can emit a sound probe signal (e.g., an ultrasound signal, etc.), corresponding to another type of wireless signal. A beacon-sensing mechanism refers to any signal-detecting apparatus that can detect the wireless signal emitted by a beacon-emitting mechanism.

More specifically, in a first case, assume that each beacon (B) has a fixed (and known) location within the environment, e.g., corresponding to the location of a sign or some other location at which the beacon is placed. That beacon emits a probe signal on a periodic basis and/or on any other basis. Each user device, carried by a particular user, has a sensor (S) (e.g., a wireless signal detector) that is configured to detect the probe signal emitted from the beacon, when within the range of that probe signal. Upon detecting the probe signal, the user device sends a message to the user-tracking component 126 that indicates that a detection event has taken place. The user device can send that message in direct fashion, or via some other unit (e.g., via a nearby sign associated with the beacon).

The message that is received by the user-tracking component 126 provides the beacon-specific code associated with the beacon. The user-tracking component 126 can consult a lookup table to map the beacon-specific code to a location of the associated beacon. In some implementations, the user-tracking component 126 can identify the user based on an authenticated user session that has already been established between the user device (which has detected the probe signal) and the analysis functionality 116. Alternatively, or in addition, the user-tracking component 126 can use a lookup table to map a device-specific code specified in the message (sent by the user device) with a particular user who is associated with that user device. Alternatively, or in addition, the user-tracking component 126 can receive a user-specific code that is sent by the user device, which serves to directly identify the user. Based on all of this collected information, the user-tracking component 126 can identify the approximate location of the user at a current point in time, e.g., corresponding to the identified location of the beacon which has been detected).

In another implementation, each user device has a beacon-emitting mechanism (beacon, B) which emits a wireless probe signal having a predetermined range and which conveys a device-specific code. The environment includes a plurality of beacon-sensing mechanisms (sensors, S) placed at fixed and known locations within the environment. Each sensor (S) is configured to detect the probe signal emitted from a user device, when within the range of that probe signal. The sensor that detects the probe signal can then communicate a message to the user-tracking component 126 which indicates that a detection event has taken place. The sign can send that message either in direct fashion, or via the user device. That message identifies the user (e.g., based on the device-specific code conveyed by the probe signal) and also identifies the sensor (by virtue of the fact that it originates from a particular sensor having a beacon-specific code associated therewith). The user-tracking component 126 then consults a lookup table to map the identity of the sensor to its location, which, in turn, provides the approximate location of the user at the current time.

In addition, or alternatively, the user-tracking component 126 can receive any other information pertaining to a detected wireless signal, such as the strength of the detected wireless signal, the directionality of the detected wireless signal, etc. In addition, or alternatively, the user-tracking component 126 can receive information that is derived from the wireless signal (or the user-tracking component 126 can generate this information itself), such as the approximate distance between the source of the wireless signal and the beacon-sensing mechanism that has detected the wireless signal.

The above two location-determination strategies are cited by way of example, not limitation. The user-tracking component 126 can use other techniques to detect the presence of a user. For example, in another technique, the user-tracking component 126 can detect the proximity of a user device to a sign (or other electronic component) within the environment using Near Field Communication (NFC) between the user device and the sign. In another technique, the user-tracking component 126 can detect the location of the user device within the environment when the user device scans a code in the environment having a known location. In another technique, the user-tracking component 126 can detect the location of the user device when the user device transmits a user-specific encrypted key code at a particular check-in location within the environment, and so on.

In another technique, the environment can include weight sensors, proximity sensors, etc. in the floor near the signs. The user-tracking component 126 can detect that a user is standing in front of a sign based on sensor information provided by one or more sensors in the floor, which respond to the presence of the user; the analysis functionality 116 can identify the user based on identifying information provided by a user device carried by the user.

In another technique, the user-tracking component 126 can detect the location of the user device based on video information provided by one or more video cameras placed within the environment. For example, each sign may include a video camera which captures the presence of a user standing before it. The user-tracking component 126 can use known analysis algorithms to detect the presence of a human being in the video information. In addition, the user-tracking component 126 can use known face recognition algorithms to detect the presence of a particular person. In addition, the user-tracking component 126 can use known recognition algorithms to detect other characteristics of a user, such as the unique gait of the user, the clothing of the user, the unique mannerisms of the user, the skeletal structure of the user, etc. One known video recognition technology extracts a collection of features from each frame of video information and compares those features with one or more feature signatures associated with known objects (e.g., known faces, gaits, etc.). The video recognition technology can use machine-learned models to perform these tasks.

In addition, or alternatively, the user-tracking component 126 can detect the presence of the user based on audio information provided by one or more microphones placed within the environment. For example, a check-in station (which may correspond to sign) can determine the presence of a particular user using known voice recognition technology, e.g., in response to the user stating his or her name or making any other utterance. In addition, or alternatively, the user-tracking component 126 can determine (or confirm) the presence of a particular person by receiving and analyzing any biometric signal (e.g., iris information, a user-specific physiological signal, etc.), provided by a biometric-signal-capture device that is located at a particular location within the environment, and so on.

In addition, or alternatively, the user-tracking component 126 can determine the absolute locations of a user device and a particular reference point, such as a particular sign. The user-tracking component 126 can then determine whether the user is nearby the reference point by comparing the two absolute locations. The user-tracking component 126 can determine the absolute location of an entity using any technique or combination of techniques, such using a Global Positioning System (GPS) technique, a wireless signal triangulation technique, a dead-reckoning technique, etc. The above-noted detection strategies are cited by way of example, not limitation; still other detection techniques can be used.

A triggering component 128 determines whether a triggering event has occurred within the environment. The triggering event prompts the analysis functionality 116 to perform further analysis. The analysis functionality 116 performs the further analysis to determine whether it is appropriate to present sign information on a particular sign under consideration, and, if so, what kind of information is appropriate to present on the sign.

The triggering component 128 can use different techniques to determine whether a triggering event has occurred. In one approach, the triggering component 128 determines when a particular user has moved (or is projected to move) within a predetermined proximity to a sign based on user presence information provided by the user-tracking component 126, and with reference to any environment-specific measure of proximity (e.g., based on an environment-specific distance threshold value).

In addition or alternatively, the triggering component 128 can determine whether the user can be considered to be directing his or her attention to the particular sign based on the sensor information. The triggering component 128 can determine a user's focus of attention in different ways. In one approach, the triggering component 126 can conclude that the user is directing his or her attention to a sign when that user lingers within a predetermined proximity to the sign for more than a prescribed amount of time. In addition, or alternatively, each sign can include a video camera that provides video information to the triggering component 128. The triggering component 128 can perform known gaze detection analysis on the video information to determine whether the user's gaze is directed to the sign, e.g., based on analysis of the positions of the users' eyes.

In some cases, the triggering component 128 can make a conclusion that a user is standing (or is otherwise present) near a sign when two or more triggering factors are present. Such a triggering rule provides further confidence that it is appropriate to provide sign information to that user. For example, the triggering component 128 can determine that the user is present in front of a sign when: (a) the user-tracking component 126 determines that a user device associated with the user lingers before the sign for more than a prescribed amount of time, e.g., based on a wireless signal emitted or detected by the user device; and (b) the user-tracking component 126 detects that a person (or, more specifically, the particular user) is present before the sign, e.g., using video recognition technology.

Altogether, the triggering component 128 outputs triggering information upon detecting a triggering event. The triggering information identifies the user who has moved within (or is projected to move within) a predetermined proximity to a sign. The triggering information also identifies the sign itself. The triggering component 128 can determine the identity of the user and the sign based on information obtained by the user-tracking component 126 in the manner described above. The triggering information can also optionally indicate whether the user can be considered to be directing his or her attention to a particular sign at a current time.

In some implementations, the triggering information can also provide fine-grained position information which reflects the position of the user relative to a particular sign. For example, the triggering information can reflect any of: (a) whether the user is standing to the left or right of a sign, or whether the user is standing directly in front of the sign; (b) the distance between the user and the sign; (c) the elevation of the user's head relative to the sign; (d) any motion exhibited by the user in front of the sign, and so on. As will be described below, the analysis functionality 116 can take any of this fine-grained information into account when generating sign information. The triggering component 128 can provide fine-grained position information regarding the location of the user using any of the strategies described above, e.g., based on wireless signals emitted or detected by the user's devices, based on video recognition technology, etc. The triggering component 128 can identify the location (and orientation) of a particular sign based on predetermined sign location information that is stored by the analysis system 116 (and which is described below).

In still other cases noted above, the sign does not have a fixed physical presence in the environment. Here, the triggering component 128 can determine that the user has moved (or is projected to move) within a predetermined proximity to a sign when it is determined that the user has moved (or is expected to move) to a region at which the sign information will be presented. The triggering component 128 can determine that the user is directing interest to the sign when the user remains within the region for more than a predetermined amount of time. Again, the triggering component 128 can draw such conclusions based on user presence information provided by the user-tracking component 126.

In the particular scenario shown in FIG. 1, a single user (e.g., a user 130) moves within a predetermined distance to a particular sign, such as the sign 108. The triggering information in that case indicates that this single 130 user is standing before that sign 108 (or existing in some other state in front of the sign 108). In other cases, two or more users (e.g., users 132 and 134) move within a predetermined distance of a particular sign, such as the sign 112. The triggering information in that case reflects that these users (132, 134) are standing before that sign 112 (or existing in some other states in front of the sign 112).

An information gathering component 136 gathers candidate information to present on a particular electronic sign in response to a triggering event. For instance, when the user 130 moves within a prescribed distance of the sign 108, the information gathering component 136 determines candidate direction information to display to the user 130 via the sign 108. When the users 132 and 134 move within a predetermined distance to the sign 112, the information gathering component 136 determines first candidate direction information to display to the user 132 via the sign 112, and second candidate direction information to display to the user 134 via the same sign 112.

Take for instance the case of user 130 who appears before sign 108. The information gathering component 136 generates the candidate information by determining one or more destinations to which the user 130 may be headed. The information gathering component 136 draws this conclusion, in turn, based on information resources 138 provided in one or more data stores. The information resources 138 include at least user information provided in one or more data stores 140, environment information provided in one or more data stores 142, and organization information provided in one or more data stores 144. Subsection A.3 (below) provides further information regarding the composition of each of these information resources.

For instance, the information gathering component 136 can consult calendar information provided in the data store(s) 140 to determine whether the user 130 has scheduled an appointment that is soon-to-occur and associated with a location that is nearby. Here, what constitutes "soon-to-occur" and "nearby" can be defined with respect to any environment-specific temporal and spatial threshold values, respectively. If this test is satisfied, the information gathering component 136 can select the location of the appointment (which is specified in the calendar information) as one possible destination.

In addition, or alternatively, the information gathering component 136 can consult habit information provided in the data store(s) 140 to determine whether the user 130 is likely to visit one or more nearby sites as detours on the way to the scheduled appointment. For example, if the user has scheduled a meeting, the habit information may indicate that the user 130 sometimes visits a kitchen and/or restroom prior to the meeting, if given sufficient time. If the current scenario conforms to such a finding, the information gathering component 136 can select the location of a kitchen and/or a restroom as additional possible candidate destinations. For each such destination, the information gathering component 136 can then use known path-finding algorithms (such as Dijkstra's algorithm) to determine directions to the destination. This yields direction information for each such destination.

The information gathering component 136 can also determine supplemental information regarding each destination. For example, assume that the calendar information (provided in the data store(s) 140) indicates that the user 130 is likely headed to a meeting. The information gathering component 136 can consult the calendar information to determine who has currently arrived at the meeting, and what attendee(s) (if any) have yet to arrive at the meeting. The information gathering component 136 can then add the attendee presence information to the information that it gathers, for presentation to the user 130 via a sign.

The user-tracking component 126 detects the location of attendees within a meeting room using any technique described above. For instance, assume that each attendee of the meeting carries a user device. That user device can detect a probe signal emitted by a beacon that is located in the meeting room. The user device can report this detection event to the user-tracking component 126 via a message. The user-tracking component 126 concludes that the user is within the room based on the message received from the user device.

Altogether, the information gathering component 136 can be said to generate unfiltered direction information. The unfiltered direction information indicates the candidate destination(s) to which the user may be headed, directions to each candidate destination, and, optionally, other supplemental information (such as attendee presence information). The direction information is said to be "unfiltered" because, at this stage, the analysis functionality 116 has not yet filtered it with respect to restriction information (described below).

Next, a filtering component 146 modifies the unfiltered direction information with respect to restriction information. Here, the term restriction information corresponds to any information and/or factor(s) that serves to restrict the gathered information based on any information disclosure concern(s) or objective(s), such as privacy-related concerns, security-related concerns, compliance-related concerns, legal-related concerns, etc., or any combination thereof (although these illustrative categories are not mutually exclusive). For example, the filtering component 146 can modify the unfiltered direction information with respect to user-specific privacy-related policies specified in the data store(s) 140. For instance, the user may prohibit his or her name from appearing on any electronic sign in any situation. In addition, or alternatively, the filtering component 1146 can modify the unfiltered direction information with respect to organization-specific policies provided in the data store(s) 144. For instance, the user 130 may belong to a company, and that company, in turn, may prohibit any sign from displaying the title of a meeting that takes place within a particular secure work area. Further, any restriction rule can have any degree of contextual complexity. For example, a user-specific privacy rule can stipulate that a sign is permitted to display the name of the user when no other person is standing with the user within a predetermined proximity to a sign.

In yet other cases, a user or organization may restrict the presentation of information to reduce unwanted informational clutter on the signs 104. For instance, a user may specify a default rule which prohibits the display of meeting participants; that rule may be motivated by a desire to reduce the amount of unwanted information (from the perspective of that user), rather than a privacy-related objective. Here, the restriction information can be referred to as clutter-preference information.

Altogether, the filtering component 146 yields filtered direction information. The filtered direction information contains some (or all) of the information in the unfiltered direction information. Alternatively, or in addition, the filtered direction information may replace some information items in the unfiltered direction information with substitute items. For example, the filtered direction information may replace the user's name with an avatar that is associated with the user.

A composing component 148 generates sign information based on the filtered direction information. For example, the composing component 148 can generate the sign information by determining the layout of the filtered direction information within a user interface presentation. In the case in which there are two or more people in predetermined proximity to a sign under consideration, the composing component 148 can allocate different regions of the user interface presentation to different respective users. The composing component 148 can then display sign information for each user within a respective region of the user interface presentation. In performing its tasks, the composing component 148 can take into consideration various layout rules, provided in the information resources 138.

A delivery component 150 can send the sign information to an appropriate electronic sign, e.g., in the form of an electronic message, via the communication conduit(s) 124. For instance, in the example specified above, the delivery component 150 sends the sign information to the sign 108 for consumption by the user 130. The delivery component 150 sends the sign information to an appropriate sign by specifying the address of that sign. In one implementation, the delivery component 150 sends the sign information to the sign in an encrypted form or other protected form. The sign can use a decryption key to decrypt the sign information prior to presenting it. This provision reduces the risk that personal user data is released to unauthorized individuals, e.g., to individuals outside a secure building.

Finally, an optional notification component 152 can convey the status of the user 130 to one or more other users. For example, assume that the user 130 is on his or her way to a meeting. The notification component 152 can send a message to each other attendee of the meeting to inform that other attendee of the current whereabouts of the user 130 (which information, in turn, is provided by the user-tracking component 126). The notification component 152 can also consult a table which provides known time-of-travel information to determine the time at which the user 130 is projected to arrive at the meeting. Each attendee can receive such a notification via his or her user device. For instance, the table accessed by the notification component 152 may provide estimated times of travel based on the current location of the user, the target location (destination) of the user, and other optional parameters (e.g., a rate of travel of the user, etc.).

FIG. 1 refers to a particular ordering of functions by way of example, not limitation; other implementations can adopt a different ordering of operations. For example, in another implementation, the filtering component 146 can perform some filtering operations prior to the certain information-gathering operations. For example, the filtering component 146 can determine whether certain information items are to be collected. If the answer is "no," then the information gathering component 136 will decline to collect those information items.

Further note that the analysis functionality 116 can perform the above-described analysis with respect to a plurality of signs and a plurality of users who appear before the signs. The analysis functionality 116 can perform this analysis for different users and different signs in a serial manner, a parallel manner, or combination thereof.

A.2. Illustrative Physical Environment

Figure 2:
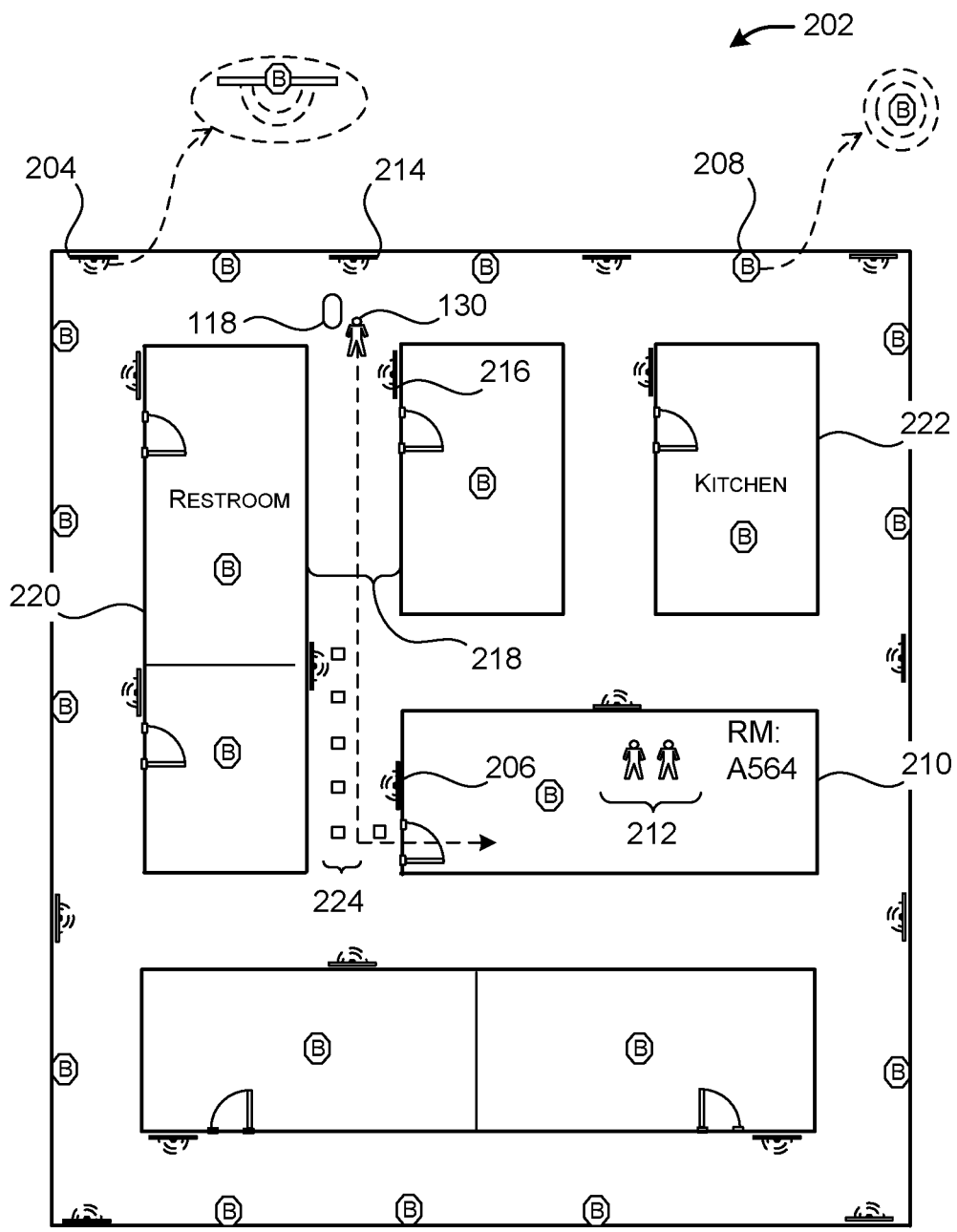
FIG. 2 shows an illustrative indoor environment that includes a collection of electronic signs.

The system 102 can be applied to any indoor or outdoor environment, or combination thereof. FIG. 2 shows one such representative indoor environment 202. The indoor environment 202 corresponds to a building having rooms and corridors by which users reach the rooms. The layout of rooms and corridors shown in FIG. 2 is merely illustrative; the system 102 can be applied to any space having any number and arrangement of rooms and corridors and other spaces.

The indoor environment 202 includes a collection of electronic signs, such as representative user sign 204. In one case, the environment 202 can place the signs on the walls of the corridors. In addition, or alternatively, the environment 202 can mount signs to the ceilings of the corridors. In addition, or alternatively, the environment 202 can embed signs into the floors of the corridors, and so on.

The environment 202 can distribute the signs throughout its space in any manner. In the case of FIG. 2, the environment 202 includes signs near those points at which guidance is expected to be useful. One such point corresponds to a juncture at which two or more corridors meet. At that location, a sign guides the user down one of the corridors. Another point corresponds to the entrance to a meeting room. At that location, a sign (such as sign 206) guides the user into the meeting room.

In one case, as described in Subsection A.1, each sign includes or is otherwise associated with a beacon (B) that emits an electromagnetic (wireless) probe signal. A user device carried by the user includes a sensor (S) which detects the wireless probe signal and sends a message to the user-tracking component 126, which indicates that a detected event has occurred. In another implementation, the user device carried by the user includes a beacon that emits a wireless probe signal. Each sign includes a sensor for detecting the probe signal when the user device is nearby. The sign then sends a message to the user-tracking component 126, which indicates that a detected event has occurred. In any case, the user-tracking component 126 can detect the presence of the user when he or she moves within the predetermined range of the probe signal. That range can be set in any environment-specific manner based on the nature of the environment 202 and/or any other factor(s).

In addition to the signs, the environment 202 includes a plurality of other beacons (and/or sensors) dispersed through the environment 202 at various locations, not necessarily associated with signs. One such beacon (or sensor) is beacon (or sensor) 208. These other beacons (and/or sensors) work in the same manner as described above, with respect to sign-affiliated beacons (and/or sign-affiliated sensors).

Further note that, as mentioned above, a sign need not correspond to a fixed physical unit in the environment 202, but can generally corresponding to any mechanism (e.g., a user device) that presents sign information at a particular region within the environment 202. In one implementation, the environment 202 can include one or more beacons (and/or sensors) associated with each such region that determines the location of the user relative to the region.

Generally, through the use of all of the beacons and sensors in the environment 202, the user-tracking component 126 knows of the whereabouts of each user in the environment 202 at any given time, whether the user appears before a sign or not.

In the illustrative example of FIG. 2, assume that the user 130 (introduced in the context of FIG. 1) is planning to attend a scheduled event. The analysis functionality 116 consults the user's calendar information in the data store(s) 140 to determine the details of the scheduled event. Specifically, the analysis functionality 116 determines that the scheduled event corresponds to a meeting being held in a room 210. The analysis functionality 116 also determines directions to that room 210. The analysis functionality 116 also determines attendee presence information that indicates that two other attendees 212 are already in the room 210; the analysis functionality 116 determines this attendee presence information based on the presence information provided by the user-tracking component 126.

Based on this gathered information, the analysis functionality 116 displays sign information on at least the sign 214 and the sign 216. That sign information guides the user 130 to the room 210, e.g., by instructing the user to advance straight down to the corridor 218 to the room 210. The sign information can optionally also identify the attendees 212 who are already in the room 210 and the attendees that have yet to arrive. Still further, the analysis functionality 116 can provide supplemental directions to a restroom 220 and/or a kitchen 222.

The analysis functionality 116 can present sign information in many other ways. For example, in addition, or alternatively, the environment 202 can include a series of display mechanisms which incrementally guide the user to each destination in a more fine-grained manner compared to the signs. For example, the environment 202 can include a collection of light emitting diodes (LEDs) 224 or the like embedded in the floor of a corridor, and/or affixed to the wall of the corridor, and/or affixed to the ceiling of a corridor, etc. The analysis functionality 116 can illuminate a series of those display mechanisms to define a path. That path guides the user into the meeting room 210. In some cases, the analysis functionality 116 can also assign the user a specific color, and can then notify the user of his or her assigned color via one of the signs (e.g., sign 214). The analysis functionality 116 can then illuminate a path of display mechanisms using the assigned color. This technical feature allows the user 130 to distinguish his or her own path from a path associated with another user, having a different color assigned thereto.

Although not shown, the analysis functionality 116 can also present supplemental visual information to the user 130 via the user device 118 carried by the user. The user 130 can consult that direction information at any time, e.g., at a sign, between signs, or when the user 130 veers off track, e.g., by taking a wrong turn. Or the user device 118 which presents the visual information can be considered the sign itself.

In addition, or alternatively, the analysis functionality 116 can present verbal audio instructions to the user at fixed locations within the environment 202. For example, the signs can include speakers that present verbal instructions and/or other audio cues. In addition, or alternatively, the analysis functionality 116 can provide verbal audio instructions to the user via the user's user device 118 as the user moves within and interacts with the environment 202, e.g., via headphones, an earbud, etc.

In addition, or alternatively, the analysis functionality 116 can provide non-verbal haptic and/or audio feedback to the user that serves to guide the user through the environment and otherwise interact with the environment. In one particular example, for instance, an item of clothing, footwear, jewelry, etc. can incorporate plural feedback mechanisms (e.g., vibration devices, etc.). The analysis functionality 116 can selectively activate the feedback mechanisms to guide the user along a desired path, e.g., by activating a left-side vibration mechanism to instruct the user to turn left, and activating a right-side vibration mechanism to instruct the user to turn right, etc.

In addition, or alternatively, the analysis functionality 116 can present audio instructions and/or non-verbal cues that the user perceives as emanating from a three-dimensional location within the environment, e.g., by using known Head-Related Transfer Function (HRTF) technology to produce directional audio information.

Finally note that the principles set forth with respect to FIG. 2 extend to outdoor settings. For instance, the corridors shown in FIG. 2 analogously correspond to roadways in an outdoor setting. The rooms shown in FIG. 2 analogously correspond to various outdoor destinations, such as street addresses, off ramps, etc. The wall or ceiling-mounted signs shown in FIG. 2 analogously correspond to roadside billboards or the like.

A.3. Illustrative Analysis Functionality

This subsection provides additional information regarding the analysis functionality 116. As indicated in Subsection A.1, the analysis functionality 116 determines when it is appropriate to present sign information on a particular sign. The analysis functionality 116 then determines the content of that sign information. The analysis functionality 116 makes its determinations based on information resources provided in one or more data stores (140, 142, 144, etc.).

Figure 3:
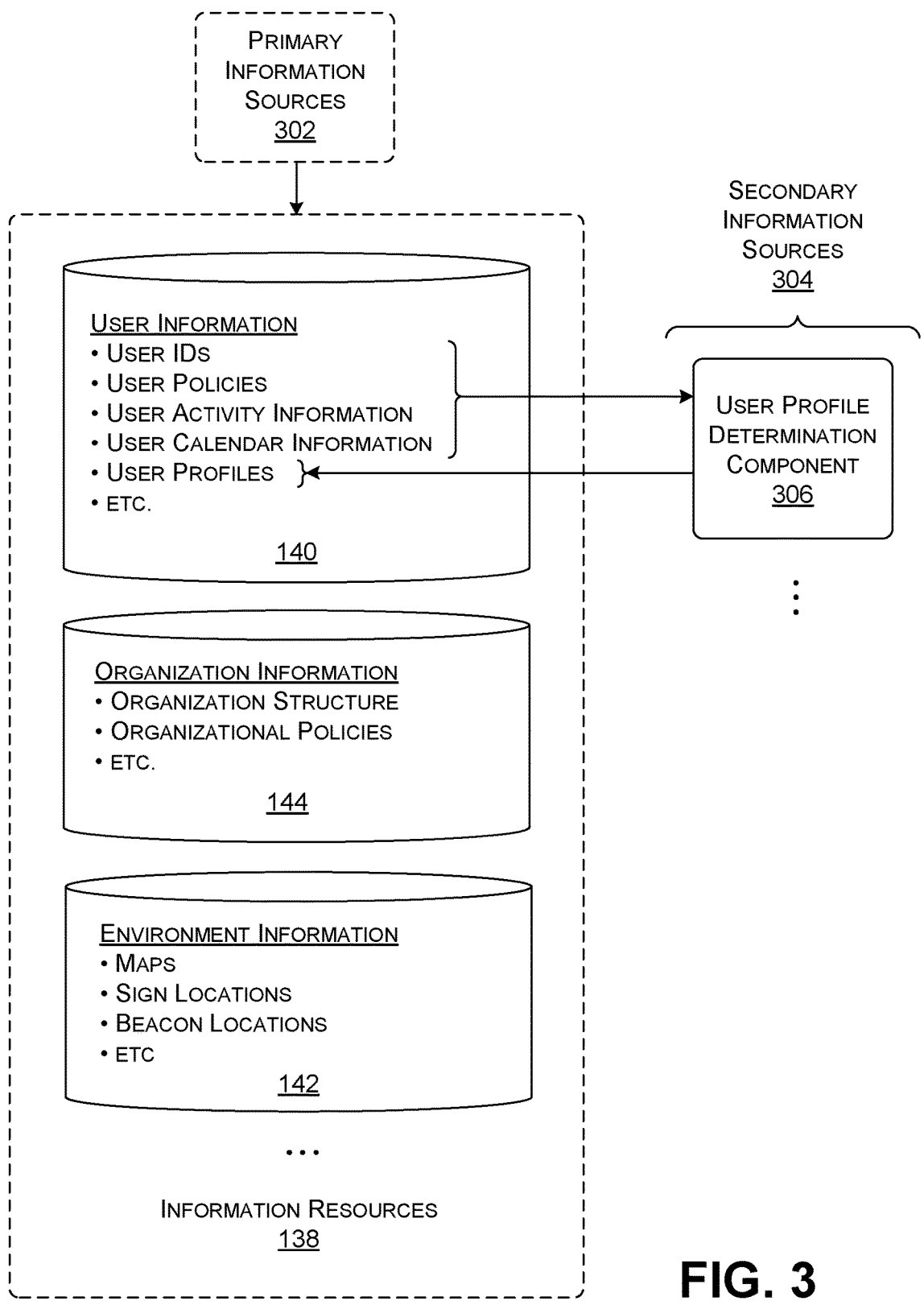
FIG. 3 shows illustrative information resources on which the system of FIG. 1 may rely in generating direction information.

To begin with, FIG. 3 provides a more detailed enumeration of the information provided in the data stores (140, 142, 144, etc.). The information originates from two general sources: primary sources 302 and secondary sources 304. A primary source provides first-level information items which it collects or generates itself. For example, a computer-implemented calendar system constitutes one primary source. The calendar system provides calendar information which describes the appointments created by a collection of users.

A second source provides second-level information that it generates based on first-level information which it obtains from the information resources 138 (and/or from other sources). For example, a user profile determination component 306 generates a user profile for each of a plurality of users. The user profile determination component generates each profile based on first-level user information that it receives from the data store(s) 140 and/or from other sources. More specifically, for instance, the user profile determination component 306 can generate one part of a user profile by determining patterns and trends in user activity information, where the user activity information constitutes first-level information provided in the data store(s) 140.

In one implementation, the user information provided in the data store(s) 140 includes user identification information, user policy information, user activity information, user calendar information, user profile information, etc. The user identification information identifies users who are authorized to interact with the system 102. The user identification information can provide the name of each user, an identification number (or other code) associated with each user, demographic information associated with each user, the contacts of each user, the organizational affiliations of each user, the devices associated with each user, and so on.

In one implementation, a pre-existing administrative computing system within an organization can provide user identification information regarding members (e.g., employees) of that organization. That pre-existing administrative computing system can also provide authentication functionality (such as a password protection mechanism) which verifies that a user who presents himself or herself as a particular individual is, in fact, that individual. The pre-existing administrative computing system can also provide security mechanisms (such as an encryption mechanism) that reduce the risk that sensitive user information is disclosed to unauthorized entities.

In other implementations, the analysis functionality 116 may initially have no preexisting information regarding a user. In that case, the system 102 can include a service that asks the user to register with the system 102 prior to interacting with the system 102. That service can then assign the new user a user identity for the purpose of interacting with the system 102. In some implementations, the service can also include functionality which allows a new user to download an application to his or her user device. That application allows the user to interact with the system 102 via the user device in the manner described above. In still other implementations, a system administrator provides each new user with an entire user device having the application already stored thereon or otherwise embodied therein.

The user policy information identifies the preferences of each user. Some policy information specifically describes the privacy-related and/or security-related preferences of each user, etc. The policy information can be expressed in any form, such as rules, parameter values, machine-trained models, etc. For example, a particular user may specify a rule that prohibits his or her name from appearing on a sign. In another case, a particular user may craft a rule that expresses a preference in a conditional manner, indicating that a prohibition applies when one or more contextual factors are present. For example, a user may provide a rule that permits his or her name to be displayed by a sign in a first building (or a first class of buildings), but not a second building (or a second class of buildings). In one case, a user may explicitly provide the policy information. Alternatively or in addition, the user profile determination component 306 may infer the policy information of a user based on lower-level activity information provided in the data store(s) 140.

The activity information describes the behavior of the user. One or more sources can provide the activity information. For instance, the user-tracking component 126 detects the movement of each user over a span of time in the manner described above. Information regarding the movement of each user corresponds to one type of activity information. Other systems can provide other types of activity information. For example, a search system can provide activity information which describes the searches and selections made by the user in the course of interacting with the search system.

The calendar information describes appointments involving at least some of the users. More specifically, each calendar entry, for a particular user, describes a particular scheduled appointment. That appointment, in turn, identifies at least the starting time, ending time, location, attendees, and title of the appointment.

A computer-implemented calendar system generates and maintains the calendar information. A user may create a calendar appointment in a manual manner by interacting with the calendar system, or the calendar system may automatically create that appointment on the user's behalf. The calendar system can also keep the calendar information abreast of updates, such as a room change, a meeting start time change, an attendee change, etc.

The profile information, produced by the user profile determination component 306, describes higher-level information regarding users. For example, the profile information can be expressed as a data structure that provides a collection of information items regarding the user. In addition, the profile information can describe the current location of the user, as provided by the user-tracking component 126. As noted above, the profile information may also contain second-level information items that it calculates, such as habit information, etc.

The organization information provided in the data store(s) 144 can include organization structure information, organization policy information, etc. The organization structure information identifies the structure of an organization. For example, the organization structure information can identify a hierarchy of divisions associated with a company, and employees affiliated with each division.

The organization policy information identifies the various restrictive policies of each organization. The policy information can be expressed in any form, such as rules, parameter values, machine-trained models, etc. For example, a particular organization may provide a security-related rule that indicates that the names of its top-tier management team are not to appear on signs. In one case, an administrator associated with an organization can manually provide the organization policy information. Alternatively or in addition, the analysis functionality 116 may infer the policies of an organization based on lower-level information.

The environment information (provided in the data store(s)) 142 can include digital map information, sign location information, beacon location information, etc. The digital map information describes the layout of one or more environments. The sign location information describes the codes and locations (and placement orientations) associated with signs placed in the environment. Similarly, the beacon location information describes the codes and locations associated with beacons (and/or sensors) placed in the environment.

The above-described information items are cited by way of example, not limitation. Other implementations can include additional information items not mentioned above. In addition, or alternatively, some implementations can omit one or more information items described above.

In some cases, one or more remote data stores (where the qualifier "remote" refers to a location that is remote from the local environment) implement the above-identified data stores (140, 142, 144). In addition, or alternatively, one or more local data stores implement the above-identified data stores (140, 142, 144). For instance, each user device can include a data store that provides local calendar information. The information gathering component 136 can consult this local data store instead of, or in addition to, a remote repository of calendar information.

Figure 4:
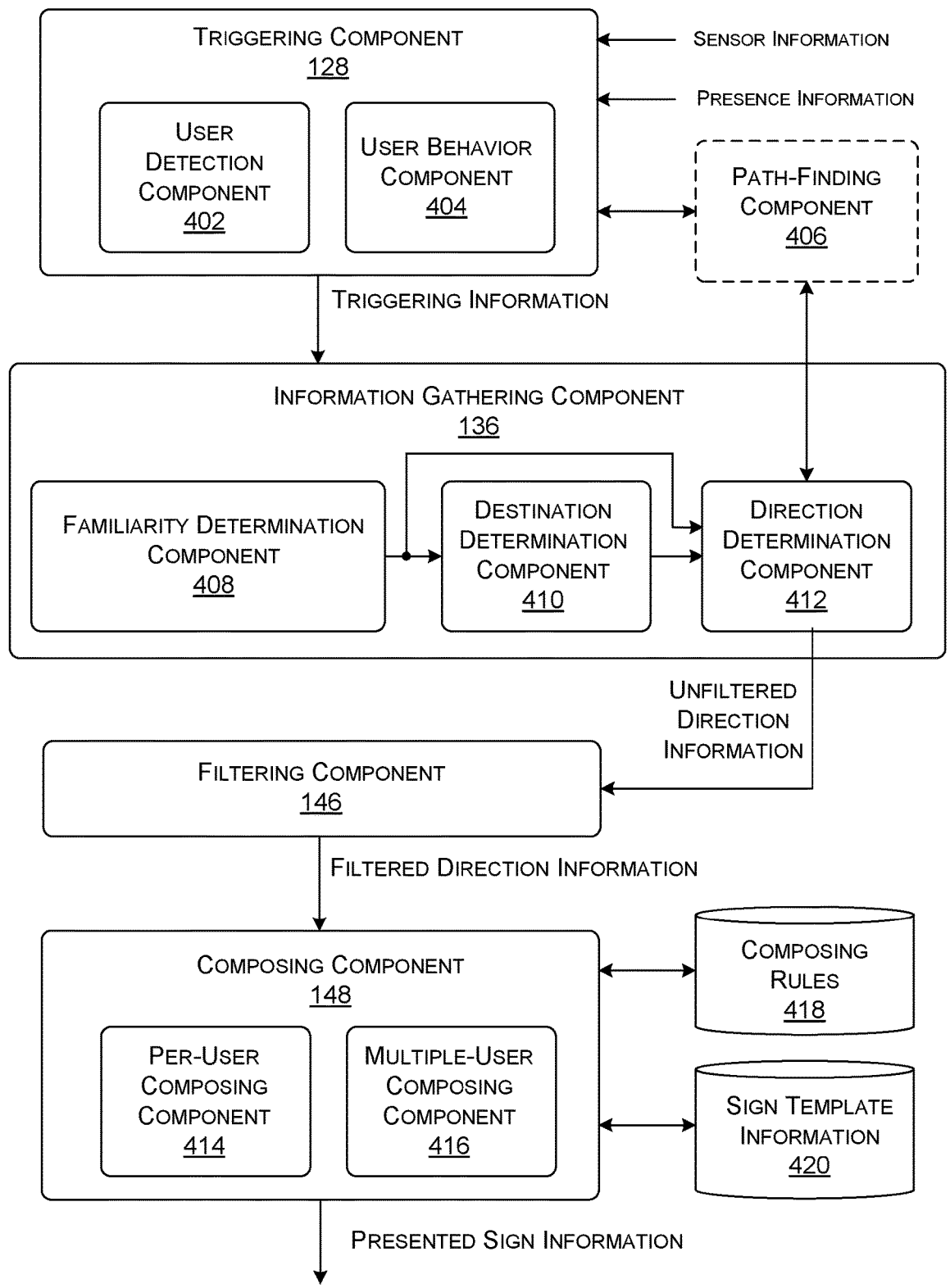
FIG. 4 shows illustrative components associated with the system of FIG. 1, including a triggering component, an information gathering component, a filtering component, and a composing component.

FIG. 4 provides a more detailed depiction of the triggering component 128, the information gathering component 136, the filtering component 146, and the composing component 148, all introduced in Subsection A.1 with respect to FIG. 1.

Beginning with the triggering component 128, this module includes a user detection component 402 and a user behavior component 404. The user detection component 402 determines whether a user is within a predetermined proximity to a particular sign based on presence information provided by the user-tracking component 126. The user-tracking component 126, in turn, can determine the location of a user in any of the ways described above. In one case, the triggering component 128 determines the user is within predetermined proximity to a sign when the user is within a predefined environment-specific distance to that sign.

In other cases, the user detection component 402 can determine whether the user is expected to come within predetermined proximity to a sign within the near future, even though the user is not currently within predetermined proximity to the sign. The user detection component 402 can make this determination based on various factors, such as the user's current path through the environment (identified by the user-tracking component 126), the calendar information (identified in the data store(s) 140), and so on. For example, assume that a user's current path suggests that the user is headed toward a particular part of a building; this can be determined by forming a trajectory of the user's current path and determining the destination(s) to which the trajectory leads. Further assume that the user's calendar information indicates that the user is scheduled to attend a meeting in that part of the building within the next fifteen minutes. Based on this evidence, the user detection component 402 can conclude that the user is currently headed toward the meeting, and can issue a triggering event in response thereto. The analysis functionality 116 can respond to the triggering event by determining the user's likely future path through the environment, and then displaying sign information on one or more signs that the user is expected to encounter on the way towards the meeting room.

The analysis functionality 116 can determine the user's likely future path using known path-finding technology, as provided by a path-finding component 406. For instance, the path-finding component 406 can use Dijkstra's algorithm to determine an optimum path through the environment to reach a specified destination, with respect to the user's current position in the environment. The path-finding component 406 also performs its analysis using map information and sign location information provided in in the data store(s) 142. The path-finding component 406 also takes into considerations the user's travel-related habits and preferences when selecting a route. For example, the path-finding component 406 can weight a path segment based on the user's preference for that segment, which, in turn, can be gauged based on past routes taken by the user through an environment. The data store(s) 140 may store route information regarding those past routes.

The user behavior component 404 determines whether the user can be considered to be directing attention to a particular sign at a particular moment. The user behavior component 404 can use various techniques described in Subsection A.1 to perform this task. In one technique, the user behavior component 404 concludes that the user is showing interest in a sign when that user remains within a predetermined distance of the sign for more than a prescribed amount of time, such as 3 seconds. In addition, or alternatively, the user behavior component 404 can use known gaze tracking technology to determine whether the user's gaze can be considered directed to a particular sign.

In response to the triggering information provided by the triggering component 128, the information gathering component 136 collects candidate information for presentation on a particular sign. In connection therewith, a familiarity determination component 408 assesses the user's presumed familiarity with the user's local environment (in which the user is currently moving). The familiarity determination component 408 can make this determination based on one or more factors. In one case, the familiarity determination component 408 can assign a familiarity value to the user's current state (which measure's the user's presumed familiarity with the local environment) as a function of the amount of time the user has spent within the local environment, which, in turn, can be determined based on activity information provided in the data store(s) 140 (provided, in turn, by the user-tracking component 126). In addition, or alternatively, the familiarity determination component 408 can assign a familiarity value to the user's current state based on an indication of whether the user is in his or her own building (e.g., where the user's office is located). The familiarity determination component 408 can make this determination based on other user information provided in the data store(s) (140, 144).

The information gathering component 136 can vary the amount of information that it collects based on the familiarity value provided by the familiarity determination component. On one end of the spectrum, assume that the familiarity determination component 408 reveals that the user is very familiar with the local environment because he or she moves in it on a day-to-day basis. The information gathering component 136 can respond by presenting only default direction information on the signs that the user is expected to encounter, rather than user-specific direction information that is tailored to the user. On the other end of the spectrum, assume that the familiarity determination component 408 can conclude that the user has never (or rarely) moved within the local environment. In response, the information gathering component 136 can provide highly detailed direction information on the signs that the user is expected to encounter in the environment. For other points along the familiarity spectrum, the information gathering component 136 can present direction information having an appropriate level of detail, between the two above-identified extremes.

A destination determination component 410 determines one or more destinations to which the user is likely to be headed. As described in Subsection A.1, the destination determination component 410 can make the above determination based on various information items provided in the information resources 138. For instance, the destination determination component 410 can mine calendar information associated with the user to determine whether the user has scheduled a meeting (or other appointment) at a nearby meeting location, in the near future. Again, what is considered "nearby" and "near" can be assessed with respect to any environment-specific spatial and temporal threshold values. In addition, or alternatively, the destination determination component 410 can mine habit information associated with the user to determine whether the user is inclined to visit one or more particular sites, at the current point in time. For instance, even in the absence of a scheduled appointment, the user's habit information may indicate that the user typically visits the kitchen at a current point in time. The destination determination component 410 can therefore suggest the kitchen as a likely destination for the user.

In yet other cases, the destination determination component 410 can identify a destination based on the application of a conditional rule. For instance, the destination determination component 410 can identify the kitchen as a candidate destination only if there is sufficient time available for the user to visit the kitchen, prior to a scheduled meeting appointment. However, the destination determination component 410 can remove that prohibition if it determines that no other attendee has currently arrived at the meeting room (which is information revealed by the user-tracking component 126).

In yet other cases, the destination determination component 410 cannot determine, with sufficiently confidence, that the user is headed to any particular destination. Or the destination determination component 410 can determine that the user is headed to a particular destination, but that the user does not need directions because the user is presumed to be familiar with the local environment. In these cases, the destination determination component 410 can identify default direction information for presentation on one or more signs in the environment. The default direction information can guide any user to one or more default destination points, such as a cafeteria, kitchen, restroom, etc.

The destination determination component 410 can choose one or more default destination sites by taking into consideration popularity information. For example, the destination determination component 410 can identify a cafeteria as a probable destination based on a determination that many people visit this site, and many have requested directions to this site. The destination determination component 410 can also use contextual factors in generating the default direction information. For example, the destination determination component 410 can only present directions to the cafeteria when the cafeteria is open for business. In addition, or alternatively, the destination determination component 410 can only present directions to meeting rooms that are booked for meetings.

A direction determination component 412 can determine direction information to each candidate destination. The direction determination component 412 can rely on the path-finding component 406 to generate directions; the path-finding component 406, in turn, can use known path-finding algorithms to compute directions, such as Dijkstra's algorithm, etc.

The direction determination component 412 can take into account any information provided in the information resources 138 in generating directions. For example, the information resources 138 can reveal that the user prefers certain routes over other routes within a building, or within indoor spaces in general. The direction determination component 412 will attempt to honor those preferences, where possible, e.g., by favorably weighting certain routes over other routes. In some cases, the user's preferences may reflect travel constraints. For example, a user who never takes the stairs may use a wheel chair to move within the environment. In another case, the information resources 138 may provide security information that impacts a user's route, such as an indication that the user is not permitted in a certain part of a building. The direction determination component 412 takes these restrictions into account when generating direction information, e.g., by excluding candidate routes that involve traversing prohibited regions.

The direction determination component 412 can formulate its directions in any level of specificity and in any form(s). For example, in some cases, the direction determination component 412 can provide map information for the user. In other cases, the direction determination component 412 can provide an arrow which points the user in an appropriate direction. In other cases, the direction determination component 412 can illuminate a series of display mechanisms (e.g., LEDs) which direct the user along a determined path, and so on. The direction determination component 412 can use various factors in determining the detail (and form) at which it formulates the direction information, such as the familiarity value provided by the familiarity determination component 408. The direction determination component 412 can increase the detail at which it provides directions in proportion to the level of unfamiliarity of the user with the local environment.

The (optional) filtering component 146 further refines the direction information provided by the information gathering component 136 based on one or more policies that identify information-presentation restrictions, provided in the information resources 138. As previously explained, the policies can take the form of user-specific policy information and/or organization-specific policy information, and/or some other type of policy information. The filtering component 146 can also modify the direction information based on an indication of whether the user is standing before a sign by himself or herself, or whether the user is standing before the sign with one or more other people; greater privacy/security may be appropriate when the user is accompanied by another person, compared to when the user is alone. An indication of whether the user is alone or with others is referred to as co-viewer information. As noted above, all information that is marshaled for the purpose of restricting the gathered information is referred to as restriction information herein.

The filtering component 146 can filter direction information in different ways. In one technique, the filtering component 146 can omit one or more information items in the unfiltered direction information provided by the information gathering component 136. In another case, the filtering component 146 can replace one or more information items with substitute information items. For instance, the filtering component 146 can replace the user's name with an avatar or other representation of the user's identity.

The composing component 148 generates sign information based on the filtered direction information provided by the filtering component 146. More specifically, a per-user composing component 414 can determine sign information to present to an individual user. The per-user composing component 414, for instance, can determine the font type, font size, color, layout, etc. of the sign information that is presented to an individual user. A multiple-user composing component 416 can determine sign information to present to two or more users. For instance, the multiple-user composing component 416 can allocate specific regions in a user interface presentation for plural respective users who happen to be engaging the same sign at a particular time. The multiple-user composing component 416 can then rely on the per-user composing component 414 to determine the sign information for each individual region, associated with a specific individual. The per-user composing component 414 can condense the sign information that it presents in a region (e.g., by reducing the size of the information and/or the amount of information) to accommodate the available "real estate" provided by the region.

The composing component 148 can perform its function based on a data store 418 that provides a collection of environment-specific sign-composing rules. For instance, one sign-composing rule can indicate the time at which sign information is to be presented for a particular user (who may be advancing towards a particular sign). Another sign-composing rule can indicate how long the sign information is to be presented for that particular user. For instance, one such rule specifies that the composing component 148 removes the sign information when it detects that the user has moved beyond a prescribed distance from the sign, and/or a prescribed amount of time has passed following the initial presentation of the sign information.

Another sign-composing rule can indicate how to handle a situation when a large crowd of individuals approaches a particular sign. For instance, one such rule can instruct the composing component 148 to only present direction information for a prescribed subset of the sign viewers. The rule can specify that subset in any manner, e.g., based on the level of unfamiliarity of each user with the local environment, the status of each user within an organization, the preference of each individual user, the amount of time that the user spends near the sign, and so on.

The composing component 148 can also rely on user (and/or organization) preference information in generating sign information. For example, a user may specify his or her preferred font size, font color, display time (identifying the amount of time information is displayed before removal), etc. For instance, a sight-challenged user may choose a large font size. The composing component 148 will honor a user's preferences in generating the sign information, when possible.

The composing component 148 can also (optionally) rely on sign template information provided in a data store 420. The sign template information provides predetermined content for presentation on a user interface presentation (or in audio form, via one or more speakers). For example, the sign template information can include a message that reads, "Hello <name>, to reach <the destination>, please <direction>," where "name," "destination," and "direction" correspond to placeholders that the composing component 148 fills in with specific values, depending on the direction information provided by the filtering component 146. The sign template information can also include stock map images.

Figure 5:
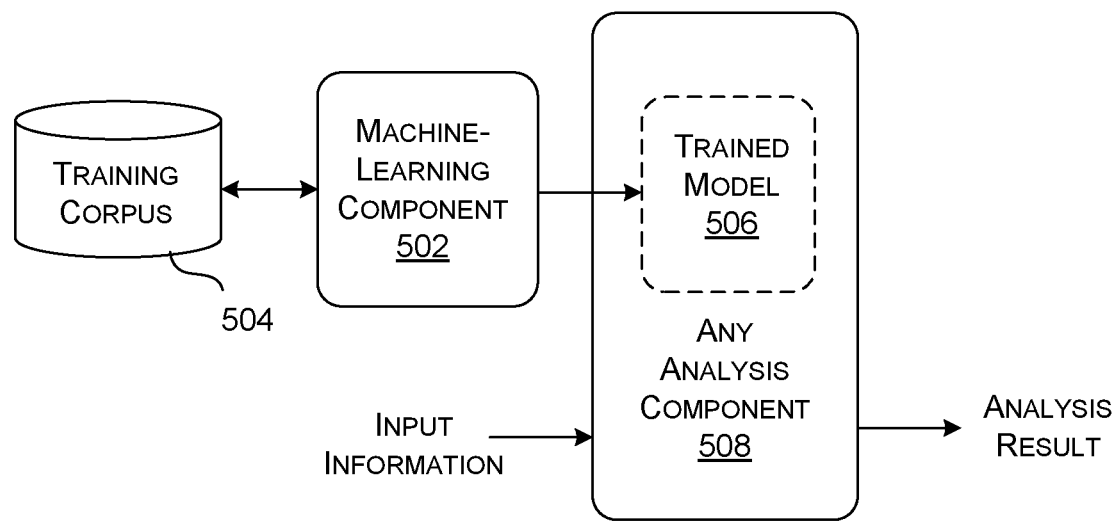
FIG. 5 shows an illustrative analysis component that uses a machine-trained statistical model.
Figure 6:
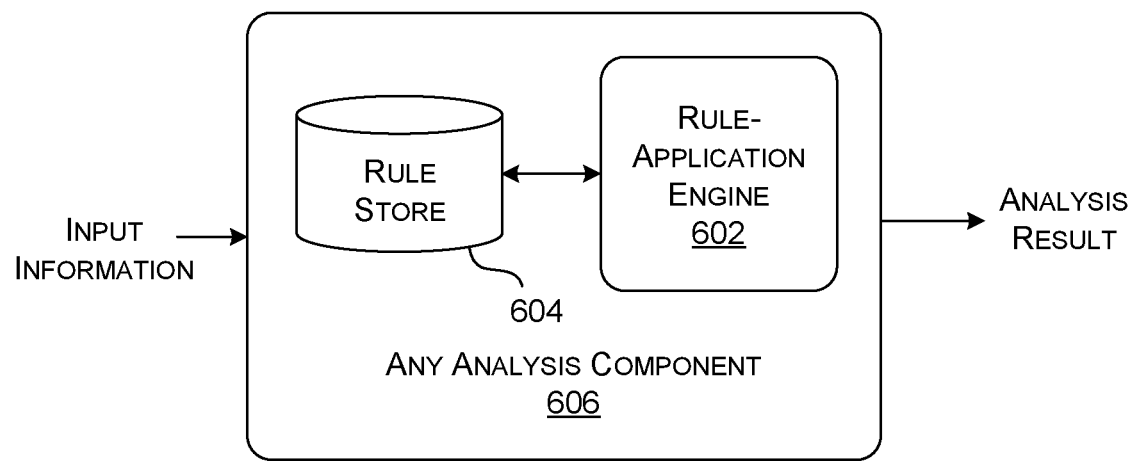
FIG. 6 shows an illustrative analysis component that uses a rules-based engine.

Advancing to FIGS. 5 and 6, the analysis functionality 116 makes various determinations in the course of generating the sign information. Some determinations define whether a triggering event has occurred. Other determinations identify whether the user requires assistance in moving within the environment (e.g., based on the user's assessed level of familiarity with the environment). Other determinations identify one or more candidate destinations for a user. Other determinations identify the manner in which direction information is to be filtered to preserve the privacy and/or ensure the security of the user and other impacted entities, or to achieve some other objective. Other determinations identify the manner in which sign information is presented on a particular sign. Still other determinations relate to background tasks, e.g., performed by the user profile determination component 306; for instance, other determinations identify patterns of behavior in user activity information. In each such case, the analysis functionality 116 can rely on any technology or combination of technologies to make a decision. For instance, the analysis functionality can rely on an explicit equation or algorithm, a machine-trained model, a rules-based system, lookup table, etc., or any combination thereof.

To cite one example, the information gathering component 136 can provide a machine-trained model to determine one or more likely destinations for a user. The machine-trained model can receive, as input, a collection of feature values. Each feature value expresses some aspect of the prevailing context in which a decision is to be made. For example, one input feature can define a candidate destination, selected from among a set of candidate destinations within a building. Other input features can describe: the time of day; the familiarity of the user with the local environment; the habits of the user; a distance between the user and the candidate destination; an indication of whether the candidate destination coincides with any scheduled appointment of the user, and so on. Based on this input information, the machine-trained model can then assign a score to the candidate destination. The score identifies the likelihood that the candidate destination represents the actual destination of the user. Overall, the information gathering component 136 can use the machine-trained model to assign a score to each candidate destination in the above-indicated manner; the information gathering component 136 then picks one or more destinations having the most favorable score(s).

A machine-trained model will learn to make appropriate destination selections based on patterns of conduct embodied in the training examples that are used to train it. For example, the machine-trained model can be trained based on a labeled set of examples. Each training examples describes a real-life or hypothetical travel scenario, and can specify: (a) a set of prevailing contextual factors; (b) a destination chosen from a set of possible destinations; and (c) an indication of whether the chosen destination is appropriate or not (where an appropriate destination matches the actual target destination of the user). Item (c) constitutes label information. A developer can manually supply the label information. Or an automated agent can infer the label information based on the destination that the traveler has actually selected. In one merely illustrative case, the machine-trained model can learn that it is less appropriate to choose a meeting destination for a user (compared to some other destination) when a significant amount of time has transpired since the start of the meeting.

As another example, the filtering component 146 can apply a collection of IF-THEN rules to determine the manner in which it filters direction information. For example, an illustrative rule can specify that the user's name can be revealed by the sign information except when the user is standing before the sign with another user, in which case the sign will display only the user's initials, and so on.

Any rule can also have a priority value associated therewith. The filtering component 146 can take a rule's priority value into consideration in various situations, e.g., as governed by one or more meta-rules. For example, assume that the filtering component 146 determines that two candidate rules apply to a contextual situation, but that only one of the candidate rules should be applied (e.g., because the two candidate rules logically conflict, or because there is some environmental factor which prevents both candidate rules from being applied at the same time, etc.). The filtering component 146 can apply a meta-rule in this situation to select the candidate rule having the highest priority level. Or if the candidate rules have the same priority level, the filtering component 146 can select a candidate rule based on some other factor(s). In one implementation, an expert developer can manually choose the priority levels for the rules. In another implementation, a machine-learned system can learn the priority levels.

For example, a user-specific rule may indicate that a particular user prefers a sign to display richly detailed meeting information. But the user's organization may prohibit such detailed meeting information in certain instances. If the organization-specific rule has a higher priority level than the user-specific rule, the organization-specific rule will have the effect of overruling the user-specific rule, and prohibiting presentation of the detailed information.

Note that machine-learning technology and rules-based technology are described above in the context of particular examples. But, to repeat, any component of the analysis functionality 116 (e.g., the triggering component 128, information gathering component 136, filtering component 146, composing component 148, etc.) can use any of this technology to make control decisions.

More generally, FIG. 5 shows a machine-learning component 502 that operates on a corpus of training examples (in a data store 504) to produce a trained model 506. An analysis component 508 corresponds to any component of the analysis functionality 116 or part thereof. The analysis component 508 uses the trained model 506 to analyze input information, to provide an analysis result. The machine-learning component 502 can use any machine-learning technique to produce any corresponding machine-trained model, such as by applying, without limitation, any of: a logistic regression technique; a support vector machine technique; a decision tree technique; a clustering technique; a neural network technique; a Bayesian network technique; and so on.

FIG. 6 shows a rule-application engine 602 and an associated collection of rules (in a data store 604) for implementing the logic associated with an analysis component 606. The analysis component 606 again corresponds to any component of the analysis functionality 116 or part thereof. The rule-application engine 602 can be implemented using any rule-based technology, such as an engine which applies a collection of IF-THEN rules, an artificial intelligence engine, an expert system, etc. An IF-THEN rule maps a particular input condition to a particular analysis result.

Figure 7:
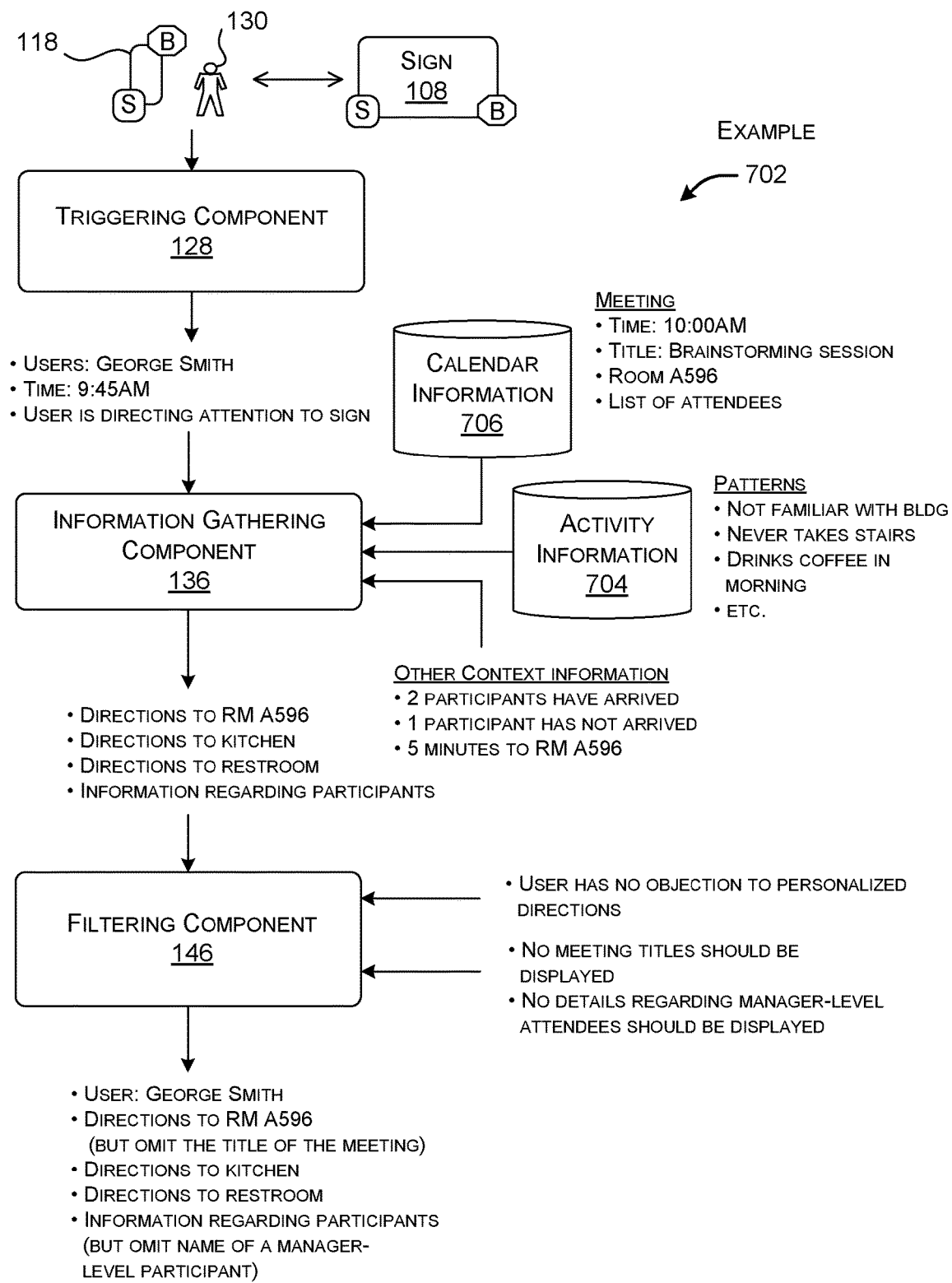
FIG. 7 shows an example of the application of the system of FIG. 1.

FIG. 7 shows a particular example 702 of the application of the analysis functionality 116. In this case, assume that a single user 130 is standing before the sign 108. Further assume that the sign 108 has a beacon which emits a probe signal. Further assume that the user 130 carries a user device 118 that includes a sensor which detects the probe signal. The probe signal conveys a sign-specific code which links it to a particular sign. The user device 118 is associated with a particular user, the fictional George Smith.

The triggering component 128 determines that the user 130 is engaging the sign 108 because the user 130 remains within a predetermined distance of the sign 108 for more than a predetermined amount of time. The triggering component 128 can determine the identity of this user 130 based on the fact that the user's user device 118 has already established an authenticated user session with the analysis functionality 116, and/or based on a device-specific code transmitted by the user device 118 to the analysis functionality 116, etc. The triggering component 128 determines the identity of the sign 108 based on code information conveyed by the sign 108 in its probe signal.

Upon receiving the triggering information from the triggering component 128, the information gathering component 136 first determines that the user may be in need of directions. The information gathering component 136 can reach this conclusion based on activity information provided in a data store 704. That activity information indicates that the user rarely visits the particular building in which he or she is currently located.

Next, the information gathering component 136 determines three candidate destinations for the user 130. The first destination corresponds to a particular meeting room. The information gathering component 136 determines that destination based on calendar information provided in a data store 706. The second and third destinations correspond to a nearby kitchen and restroom, respectively. The information gathering component 136 determines those destinations primarily based on activity information provided in the data store 704. That activity information indicates that the user typically visits the bathroom and/or kitchen prior to meetings, if time permits. The information gathering component 136 also determines the second and third destinations based on an assessment that the user 130 has sufficient amount of time to visit these locations prior to the start of the meeting.

The information gathering component 136 then proceeds to determine directions to each of the three destinations. In doing so, the information gathering component 136 can again consult activity information in the data store 704. For example, one piece of information in that data store 704 indicates that the user 130 never takes the stairs, possibly due to a handicap that may affect the user. The information gathering component 136 can therefore generate direction information which does not involve the use of the stairs.

Finally, the information gathering component 136 can generate supplemental information regarding one or more of the above-identified destinations. For example, the information gathering component 136 can determine that two of the attendees to a scheduled meeting (to which the user 130 is presumably headed) have arrived at the meeting location, while one participant has not yet arrived. The information gathering component 136 can also provide a projected time of arrival of the user 130 to the meeting, which can be based on an assessed distance between the user's current position and the meeting location, together with an estimated rate of travel of the user 130 (which can be based on default user travel information and/or activity information pertaining to the user 130 in the data store 706, which reflects the user's typical rate of travel).

The filtering component 146 next modifies the direction information provided by the information gathering component 136. For instance, although the user 130 has expressed no prohibitions regarding information that can be presented on a sign, the user's organization prohibits any sign from displaying meeting title information. The organization also prohibits any sign from displaying details regarding manager-level employees. Hence, the filtering component 146 will strip out the meeting title and the name of one of the meeting participants from the information collected by the information gathering component 136.

A.4. Illustrative Electronic Sign

Figure 8:
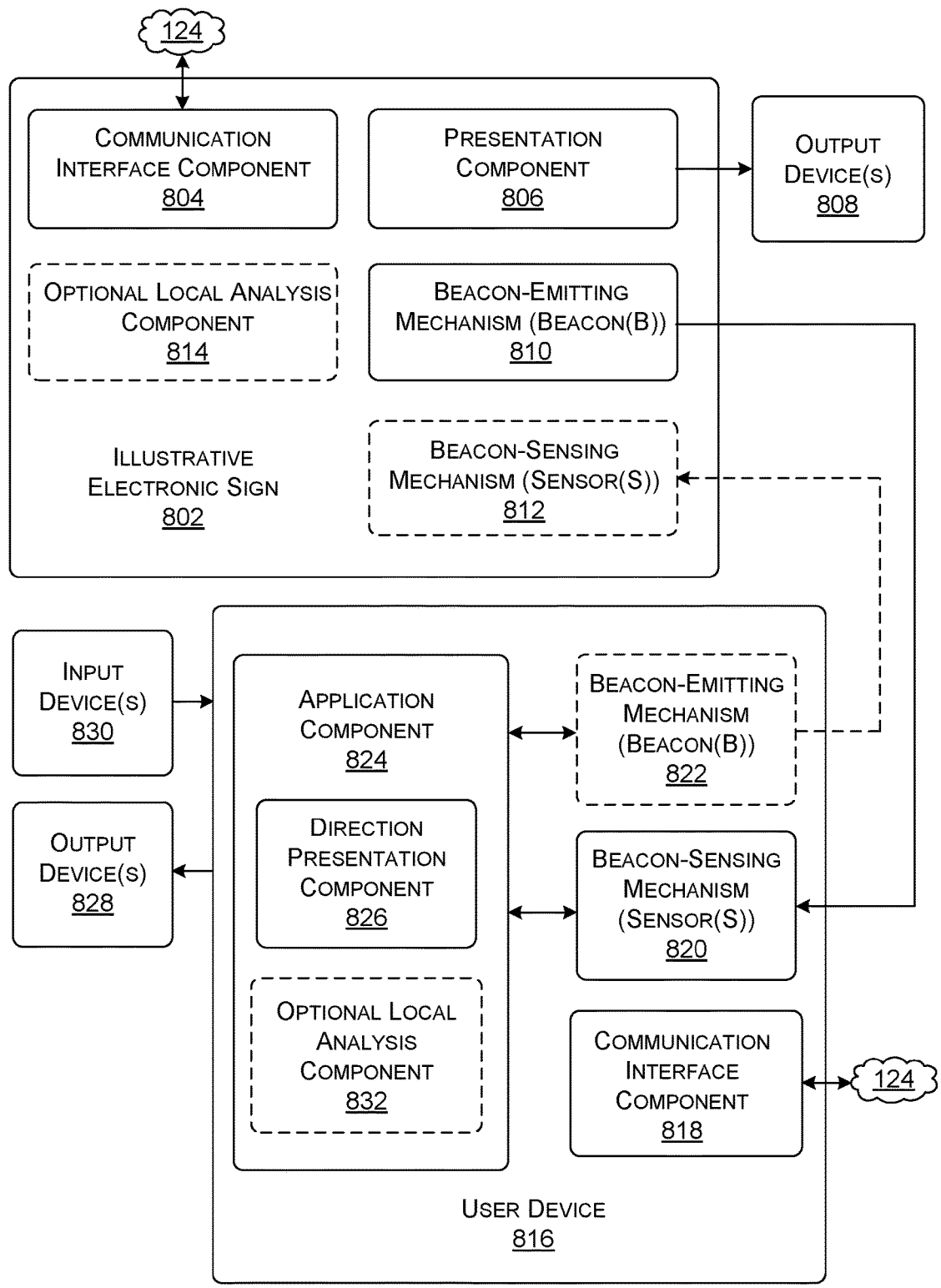
FIG. 8 shows an illustrative electronic sign and an illustrative user device for use in the system of FIG. 1.

FIG. 8 shows one implementation of an electronic sign 802, here corresponding to a sign that is capable of presenting a visual user interface presentation, and/or presenting sign information in some other form (such as audio form). A communication interface component 804 provides one or more communication mechanisms that allow the sign 802 to communicate with the analysis functionality 116 via the communication conduit(s) 124, and/or any other component of the system 102 of FIG. 2. A presentation component 806 provides a user interface presentation on one or more output devices 808. The output device(s) 808 can include any display device, such as a cathode ray tube device, a liquid crystal display device, an electronic ink display, projection mechanism, etc., or any combination thereof. In addition, or alternatively, the output device(s) 808 can include one or more speakers, one or more haptic output mechanisms, etc. In some implementations, the sign 802 can include (or is otherwise associated with) a beacon-emitting mechanism 810 (beacon, B) which emits a probe signal on a periodic basis and/or any other basis. The probe signal contains a beacon-specific code which is associated with the sign 802. Alternatively, or in addition, the sign 802 can include a beacon-sensing mechanism (sensor, S) 812 that is capable of receiving a probe signal that is emitted from some other device, such as a user device.

In some implementations, the sign 802 can also include a local analysis component 814. The local analysis component 814 handles one or more functions of the analysis functionality 116 described above. For instance, the local analysis component 814 can incorporate logic which determines whether the user can be considered to be directing attention to the sign 802, which is a function attributed above to the triggering component 128.

In some cases, the sign 802 corresponds to a computing device that includes one or more general purpose computing units, driven by instructions provided in one or more storage devices. In other cases, the sign 802 corresponds to a more limited-purpose computing unit, e.g., correspond to a device that can be considered relatively "dumb" compared to a general purpose computing device. In that case, the sign 802 can include discrete logic circuitry, such as an Application Specific Integrated Circuit (ASIC), etc.

In yet another implementation, the sign 802 is interactive. For example, the sign 802 can incorporate a touch-sensitive input device (not shown) that allows a user to interact with the user interface presentation that it provides. Through this interaction, the user may request additional information regarding an indicated destination, request information regarding additional destinations, and so on. In addition, or alternatively, the sign 802 can incorporate (or otherwise make available) a voice input device (having voice recognition functionality) which allows a user to interact with the sign via voice commands.

A.5. Illustrative User Device

FIG. 8 also shows one implementation of a user device 816 that the user carries as he or she moves within an environment. A communication interface component 818 provides one or more communication mechanisms that allow the user device 816 to communicate with the analysis functionality 116 via the communication conduit(s) 124, and/or any other component of the system 102 of FIG. 2. In some implementations, the user device 816 can also include a beacon-sensing mechanism 820 (sensor, S) that is capable of receiving a probe signal that is emitted from some other device, such as a sign. In other implementations, the user device can include a beacon-emitting mechanism 822 (beacon, B) that emits a probe signal on a periodic basis and/or any other basis. The probe signal contains a device-specific code which is associated with the user device 816.

The user device 816 can also provide an application component 824 that performs one or more tasks pertaining to its role within the system 102 of FIG. 1. For example, the application component 824 can include a direction presentation component 826 that presents supplemental direction information (received from the analysis functionality 116) on one or more output devices 828. Or the direction presentation component 826 may constitute the primary source of sign information, making the user device 816 a sign in its own right. The output device(s) 828 can include any display device, such as a cathode ray tube device, a liquid crystal display device, etc., or any combination thereof. In addition, or alternatively, the output device(s) 828 can include one or more speakers, one or more haptic output mechanisms, etc. The user device can also include one or more input devices 830, such as a touch-screen input device, a key input device, a voice input device, etc., or any combination thereof.

In some implementations, the application component 824 can also include a local analysis component 832. The local analysis component 832 handles one or more functions of the analysis functionality 116 described above. For instance, the local analysis component 832 can incorporate a data store which provides calendar information for consideration by the information gathering component 136. The local analysis component 832 can also perform one or more analysis tasks previously attributed to the information gathering component 136, and/or any other component of the analysis functionality 116.

In some cases, the user device 816 corresponds to a computing device that includes one or more general purpose computing units, driven by instructions provided in one or more storage devices. For instance, the user device 816 may correspond to a smartphone, a tablet-type computing device, a laptop computing device, and so on. In other cases, the user device 816 corresponds to a more limited-purpose computing unit. For instance, the user device 816 may correspond to a tag unit (e.g., an RFID tag) carried by the user that includes discrete logic circuitry, such as an Application Specific Integrated Circuit (ASIC), etc.

A.6. Illustrative User Interface Presentations

Figure 9:
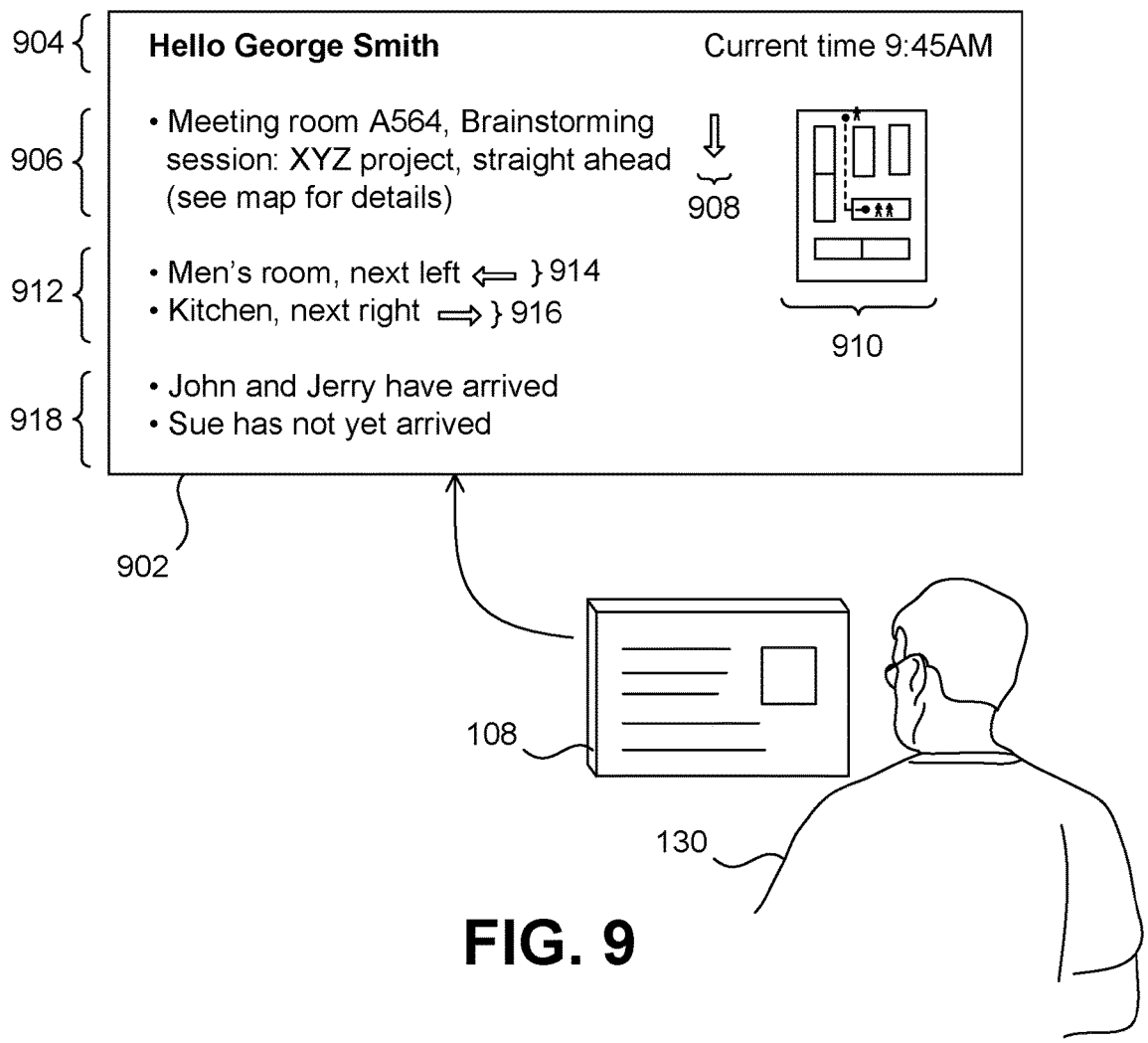
FIGS. 9-12 show illustrative user interface presentations provided by an electronic sign, using the system of FIG. 1.

FIG. 9 shows one user interface presentation 902 that can be presented by the system 102 of FIG. 1. The system 102 presents this user interface presentation 902 to a user 130 on a particular electronic sign 108. A first portion 904 of the user interface presentation 902 displays the name of the user (here, the fictional "George Smith"), if so permitted by the applicable policies. A second portion 906 displays a most likely destination of the user, corresponding to a scheduled meeting in which the user 130 is an attendee. The user interface presentation 902 can provide direction information to the meeting in the form of an arrow 908, a map 910, and/or some other form of guidance. A third portion 912 displays two other candidate destinations for the user's consideration, corresponding to a nearby restroom and a kitchen. The user interface presentation 902 can provide direction information to these other destinations in any form; here, the user interface presentation 902 conveys the direction information in the form of arrows (914, 916). Finally, a fourth portion 918 provides information regarding meeting attendees that have arrived at the meeting location, and attendees that have not yet arrived.

The direction information in the case of FIG. 9 guides the movement of a user through the environment. In addition, or alternatively, any direction information can more generally instruct the user how to interact with the environment. For example, the direction information can provide an explanation regarding how to open a door to a secure room, etc.

Figure 10:
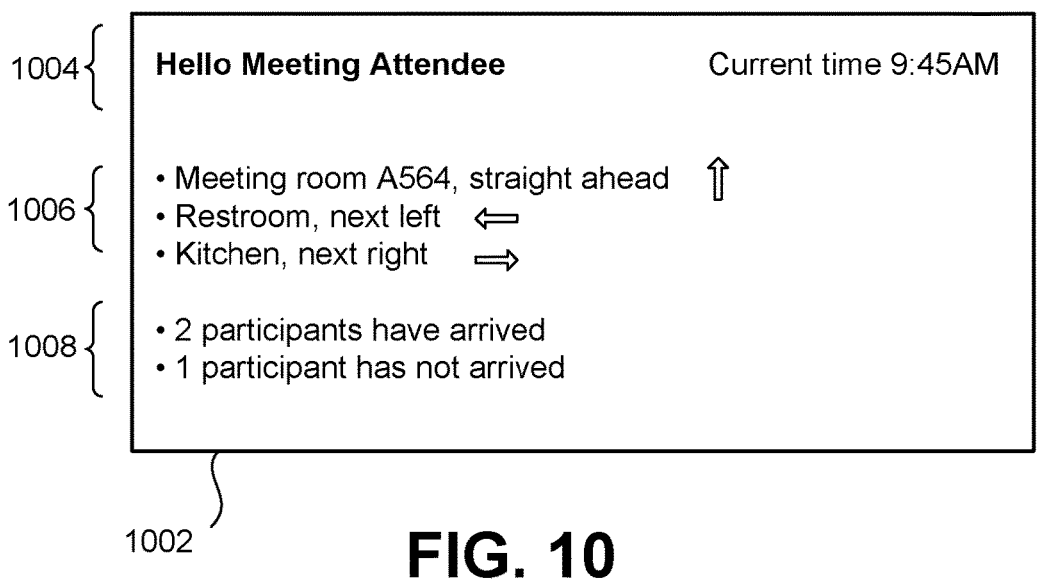

In the case of FIG. 10, the system 102 provides a user interface presentation 1002 having less detailed information compared to the user interface presentation 902 of FIG. 9, to comply with one or more policies specified by the user 130 and/or the user's organization, and/or other impacted entities. For instance, a first portion 1004 of the user interface presentation 1002 provides a generic greeting without revealing the name of the user 130. A second portion 1006 provides destination information without revealing the nature of the meeting (e.g., by omitting the meeting title and other identifying information). A third portion 1008 identifies who is present and absent in the meeting room without revealing the attendees' names.

Figure 11:
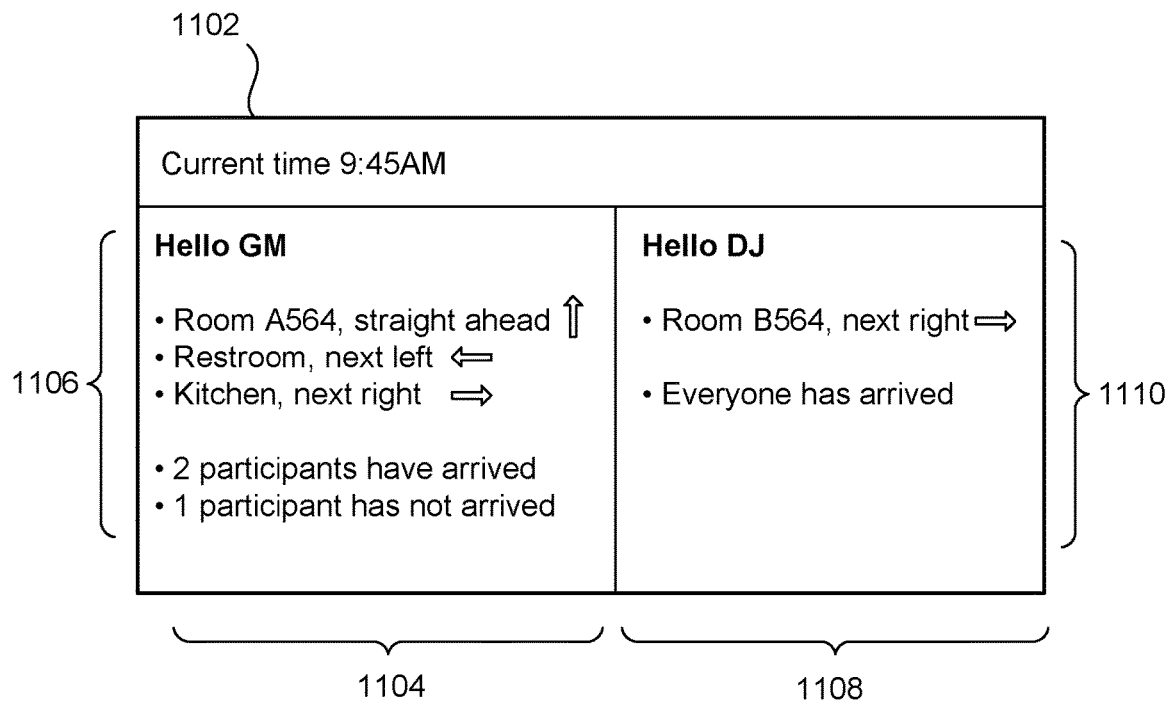

In FIG. 11, the system 102 provides a user interface presentation 1102 that provides direction information to two users (e.g., users 132 and 134) who happen to be standing before a sign (e.g., sign 112) at the same time. More specifically, the composing component 148 allocates a first display region 1104 for presenting sign information 1106 for the first user 132, and allocates a second display region 1108 for presenting sign information 1110 for the second user 134. The composing component 148 can perform this allocation based on one or more rules provided in the data store 418; for example, for the case in which n users are present before a sign, the composing component 148 can divide the available screen space into n equal-sized rectangular display regions. But if n>k, the composing component 148 can select the k highest-ranked users, where k is a predetermined (sign-specific) maximum number of display regions; the composing component 148 can use any factor(s) to rank the users, such as: the user's familiarity with the local environment; the user's distance to the sign; the user's lateral orientation with respect to the sign (e.g., indicating whether the user is standing directly in front of the sign or to either side of the sign); the user's vertical orientation with respect to the sign (e.g., indicating whether the user's head is above or below the sign), and so on.

In the two-region case of FIG. 11, the analysis functionality 116 can apply first analysis to determine the sign information 1106 to be presented in the region 1104, and second analysis to determine the sign information 1110 to be presented in the region 1108. Different filtering considerations may apply to these separate respective analyses. Further assume that triggering information (from the triggering component 128) indicates that the two users are standing side-by side in front of the sign. The composing component 148 can display the sign information (1106, 1110) to the two users in a side-by-side relationship which complements the respective relative positions of the users, e.g., such that a right-most user is allocated a right-most display region, etc.

Figure 12:
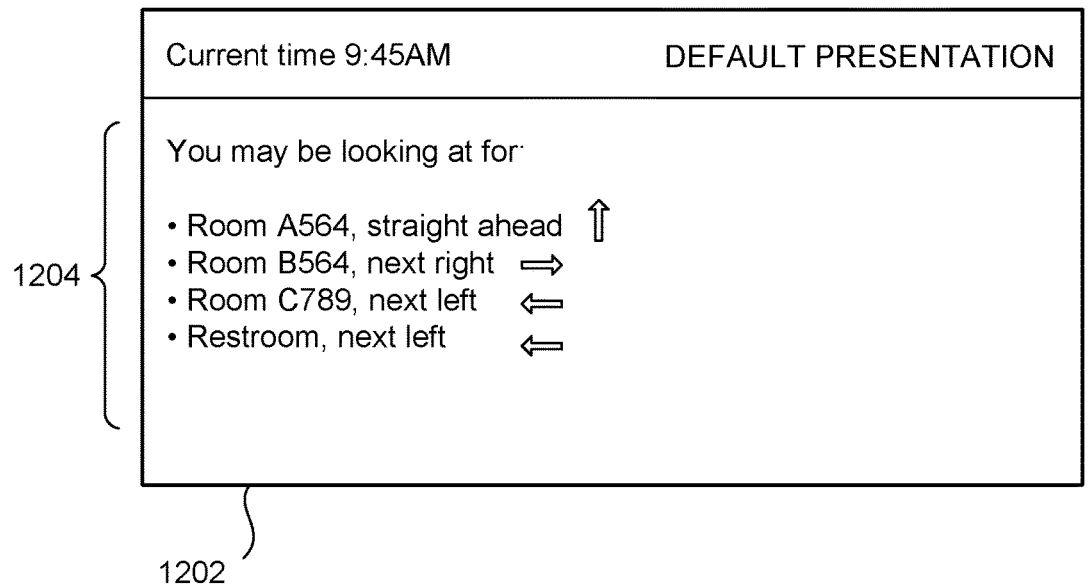

Finally, in FIG. 12, the system 102 provides a user interface presentation 1202 that provides default sign information 1204. The system 102 may present default sign information 1204 on the sign when it determines that no user is within a predetermined proximity to the sign that needs directions. The default directions can nevertheless take into consideration context information mined from the information resources 138, such as information which indicates the existence of nearby scheduled meetings that are about to commence.

Although not shown, in other implementations, the system 102 can present any or all of the information shown in FIGS. 9-12 in audible form, e.g., via one or more speakers. The speakers may be associated with fixed locations in the environment, and/or may be provided by one or more devices carried by the user (or which otherwise accompany the user as he or she traverses the environment). For example, the system 102 can present audio instructions to the user via headphones worn by the user as he or she moves through the environment, or by a speaker associated with the user's user device. In another context, the system 102 can present audio instructions to the user who his traversing an outdoor space via a radio receiving unit provided in the user's vehicle. In addition, or alternatively, the system 102 can present information via directional audio and/or haptic cues, as described above in connection with FIG. 2, e.g., by activating a left-side vibration mechanism to instruct the user to turn left, etc.

B. Illustrative Processes

Figure 13:
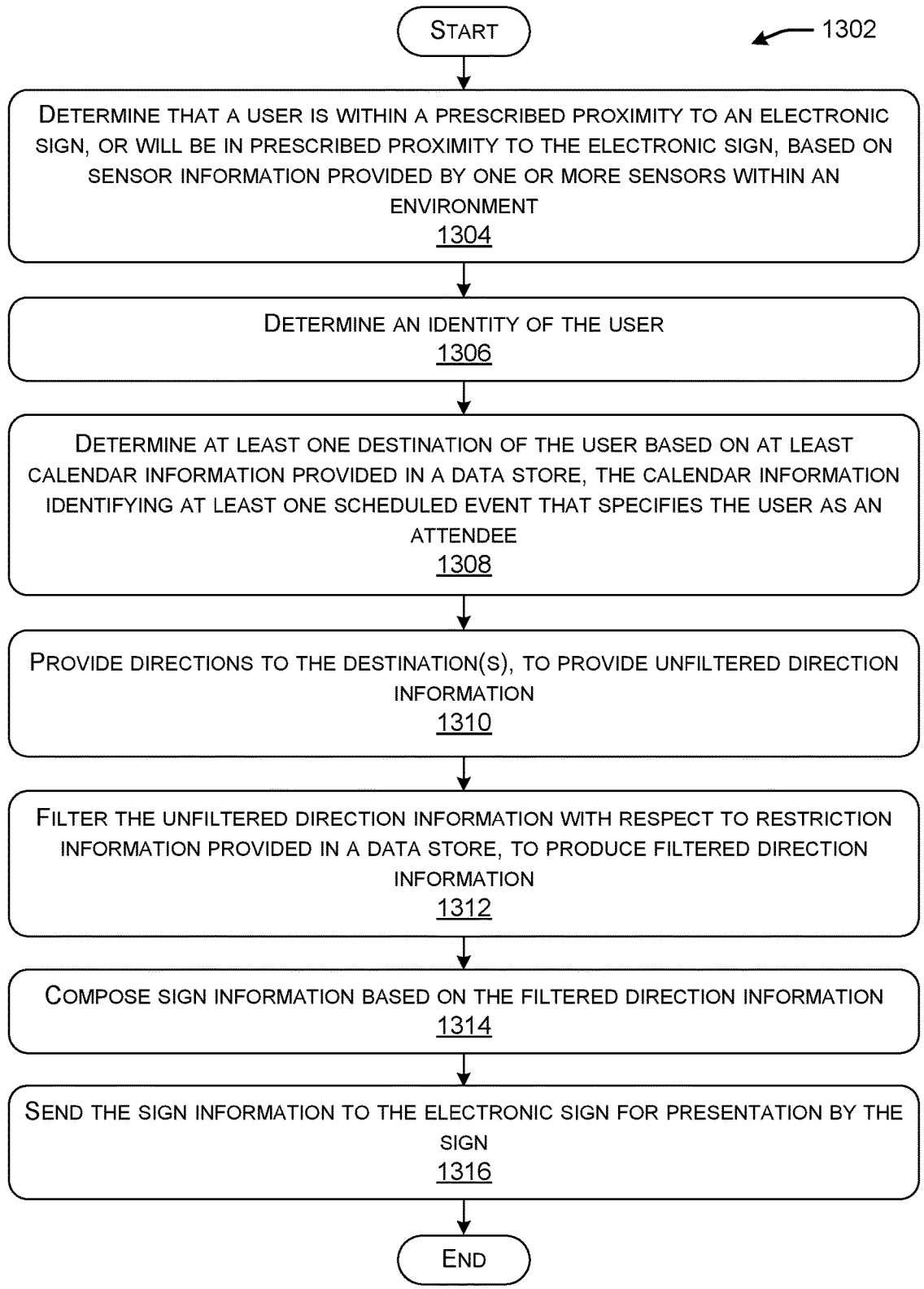
FIG. 13 shows a process that represents one manner of operation of the system of FIG. 1.

FIG. 13 shows a process 1302 that explains the operation of the system 102 of Section A in flowchart form. The process 1302 assists the user in moving through an environment, whether indoor, outdoor, or combination thereof. Since the principles underlying the operation of the system 102 have already been described in Section A, certain operations will be addressed in summary fashion in this section.

In block 1304, the system 102 determines that the user is within a prescribed proximity to an electronic sign, or will be in prescribed proximity to the electronic sign, based on sensor information provided by one or more sensors within the environment. The phrase "prescribed proximity to an electronic sign" has an expansive meaning as used herein. For instance, a user may come within a prescribed proximity to an electronic sign when he or she comes within a prescribed distance of a physical sign having a fixed presence in the environment. In another case, the user comes within a prescribed proximity to an electronic sign when the user enters a region at which sign information will be presented by some mechanism (including a portable device carried by the user). In block 1304, the system 102 can also optionally determine whether there are any other users also within the prescribed proximity to the electronic sign based on the sensor information. In block 1306, the system 102 determines an identity of the user. In block 1308, the system 102 determines at least one destination of the user based at least on calendar information provided in at least one data store (140, 142, 144). The calendar information identifies at least one scheduled event that specifies the user as an attendee. The system 102 can also optionally determine one or more destinations based on habit information.

In block 1310, the system 102 provides directions to the destination(s), to provide unfiltered direction information. Here, the phrase "direction information" has an expansive meaning. In some cases, the direction information refers to instructions that guide the movement of the user through the environment. In other cases, the direction information refers to instructions regarding how to more generally interact with the environment, e.g., by explaining how to operate a key card to gain entrance to a room. Here, the "destination" more generally corresponds to the objective to be achieved by the user. In block 1312, the system 102 filters the unfiltered direction information with respect to restriction information (e.g., privacy information and/or security information, etc.) provided in the data store(s) (140, 142, 144), to produce filtered direction information. In block 1314, the system 102 composes sign information based on the filtered direction information. And in block 1316, the system 102 sends the sign information to the electronic sign for presentation by the sign, e.g., via an electronic message sent over a communication conduit.

As noted in the prefatory part of the Detailed Description, the flowchart of FIG. 13 is expressed as a series of operations performed in a particular order. But the order of these operations is merely representative, and can be varied in any manner. For example, the above-noted filtering operation (in block 1312) can take place prior to the above-noted information gathering operations, which has the effect of limiting the information that is obtained. Further, one or more operations shown in FIG. 13 can be omitted, such as the filtering operation in block 1312.

C. Representative Computing Functionality

Figure 14:
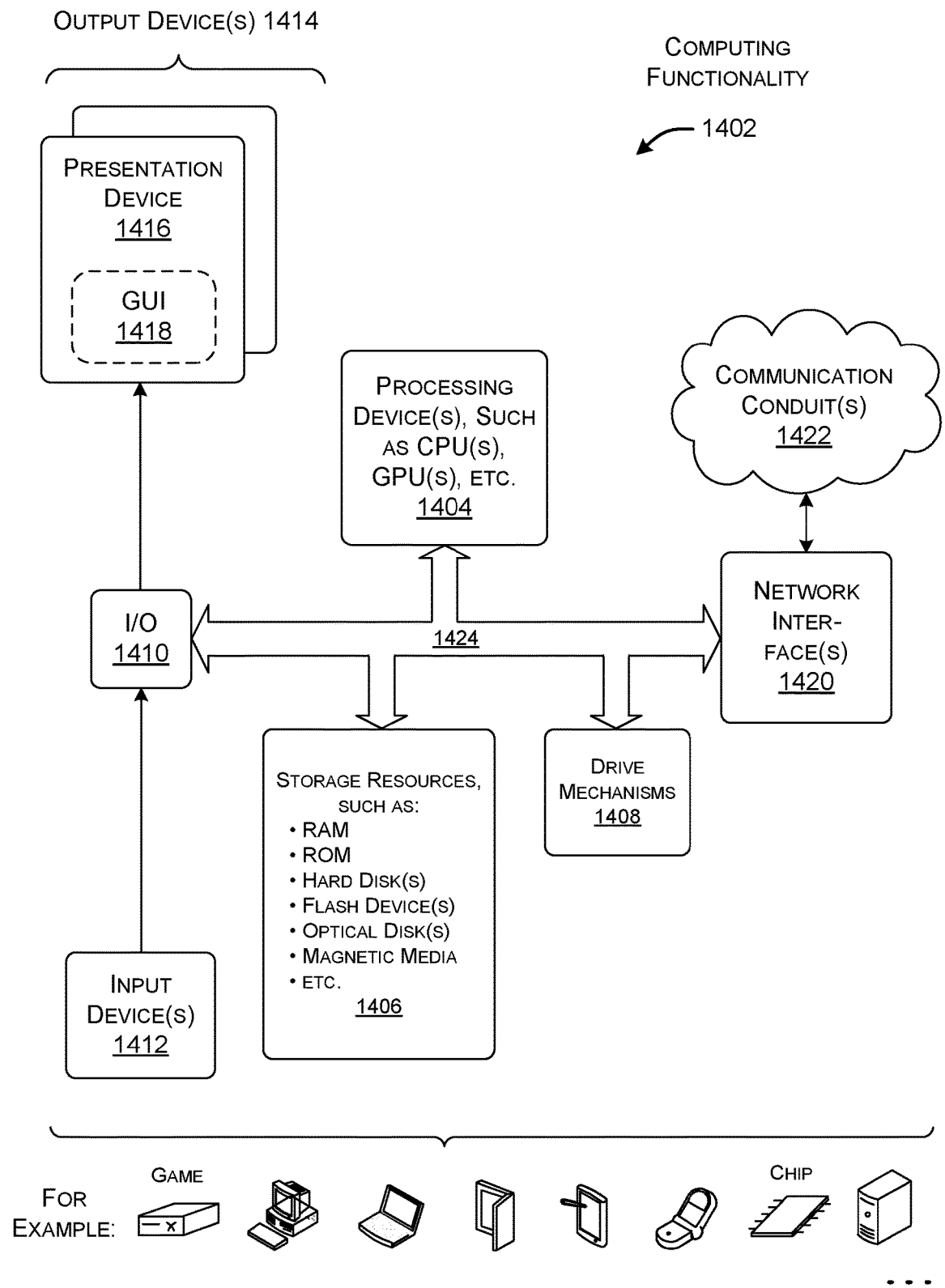
FIG. 14 shows illustrative computing functionality that can be used to implement any aspect of the features shown in the foregoing drawings.

FIG. 14 shows computing functionality 1402 that can be used to implement any aspect of the mechanisms set forth in the above-described figures. For instance, the type of computing functionality 1402 shown in FIG. 14 can be used to implement any of the any aspect of the analysis functionality 116 (e.g., corresponding to one or more server computing devices), any aspect of a user device, any aspect of an electronic sign, and so on. In all cases, the computing functionality 1402 represents one or more physical and tangible processing mechanisms.

The computing functionality 1402 can include one or more hardware processor devices 1404, such as one or more central processing units (CPUs), and/or one or more graphical processing units (GPUs), and so on. The computing functionality 1402 can also include any storage resources (also referred to as computer-readable storage media or computer-readable storage medium devices) 1406 for storing any kind of information, such as machine-readable instructions, settings, data, etc. Without limitation, for instance, the storage resources 1406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1402. The computing functionality 1402 may perform any of the functions described above when the hardware processor device(s) 1404 carry out computer-readable instructions stored in any storage resource or combination of storage resources. The computing functionality 1402 also includes one or more drive mechanisms 1408 for interacting with any storage resource, such as a hard disk drive mechanism, an optical disk drive mechanism, and so on.

The computing functionality 1402 also includes an input/output component 1410 for receiving various inputs (via input devices 1412), and for providing various outputs (via output devices 1414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1416 and an associated graphical user interface presentation (GUI) 1418. The display device 1416 may correspond to a charge-coupled display device, a cathode ray tube device, an electronic ink display device, a projection mechanism, etc. Other output devices include a printer, a model-generating mechanism, a haptic output mechanism, an archival mechanism (for storing output information), and so on. The computing functionality 1402 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area computer network, a wide area computer network (e.g., the Internet), point-to-point connections, etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method, implemented by one or more computing devices, is described for assisting a user in interacting with an environment. The method includes: determining that the user is within a prescribed proximity to an electronic sign, or will be in prescribed proximity to the electronic sign, based on sensor information provided by one or more sensors within the environment; determining an identity of the user; and determining at least one destination of the user based at least on calendar information provided in at least one data store, the calendar information identifying at least one scheduled event that specifies the user as an attendee. The method also includes: providing directions to the destination(s), to provide direction information; composing sign information based on the direction information; and sending the sign information to the electronic sign for presentation by the sign. The sign information is sent via an electronic message over a communication conduit.

According to a second aspect, the method further includes: determining whether the user can be considered to be directing attention to the electronic sign at a current time; and producing direction information only when the user is directing attention to the electronic sign. The user can be considered to be directing attention to the electronic sign by: determining a length of time that the user remains within the prescribed proximity to the electronic sign; and/or determining whether a gaze of the user is directed to the electronic sign.

According to a third aspect, the determining of the destination(s) includes: identifying a scheduled event that the user is scheduled to attend; and specifying a destination that corresponds to a location at which the scheduled event will take place.

According to a fourth aspect, the determining of the destination(s) also includes: identifying habit information, specified in the data store(s), that identifies one or more habits of the user; and selecting at least one additional destination based on the habit information.

According to a fifth aspect, the determining of the destination(s) also includes: determining an amount of time between a current time and a time at which the scheduled event is to commence; and selecting the additional destination(s) only when the amount of time is sufficient to accommodate a visit to the additional destination(s).

According to a sixth aspect, the direction information also identifies whether any other attendee of the scheduled event has already arrived at the location at which the scheduled event is to take place.

According to a seventh aspect, the method further includes notifying at least one other attendee of the scheduled event of a current status of the user.

According to an eighth aspect, the providing operation (in which directions are provided) includes: determining a degree of familiarity of the user with the environment; and determining a level of specificity at which directions are to be provided based the degree of familiarity.

According to a ninth aspect, the method further includes filtering the direction information with respect to restriction information, to produce filtered direction information. In one case, the restriction information includes user policy information, provided in the data store(s), which indicates a user-specific policy of the user with respect to presentation of information on the electronic sign.

According to a tenth aspect, the restriction information includes organization policy information, provided in the data store(s), which indicates an organization-specific policy of an organization with respect to presentation of information on the electronic sign.

According to an eleventh aspect, the restriction information includes co-viewer information that indicates whether there is any other user that is within the prescribed proximity to the electronic sign at a current time.

According to a twelfth aspect, the composing operation includes selecting the layout of two or more instances of sign information on the electronic sign, corresponding to two or more users.

According to a thirteenth aspect, the method further includes sending supplemental direction information to a portable user device that is carried by the user.

According to a fourteenth aspect, the method further includes: detecting, on another occasion, that no user who is unfamiliar with the environment is within the prescribed proximity to the electronic sign; determining at least one default destination based on at least one contextual factor; providing directions to the default destination(s), to provide default direction information; composing default sign information based on the default direction information; and sending the default sign information to the electronic sign for presentation by the electronic sign.

According to a fifteenth aspect, one or more computing devices are described that assist a user in interacting with an environment. The device(s) include at least one data store that provides user information regarding a plurality of users, organization information that pertains to one or more organizations with which at least some of the users are affiliated, and environment information pertaining to the environment. The device(s) also include: a triggering component configured to trigger presentation of information on an electronic sign. The triggering component, in turn, includes: logic configured to determine that a user is within a prescribed proximity to the electronic sign, or will be in prescribed proximity to the electronic sign, based on sensor information provided by one or more sensors within the environment; and logic configured to determine an identity of the user. The device(s) also include an information gathering component configured to collect information for presentation on the electronic sign. The information gathering component includes: logic configured to determine at least one destination of the user based at least on calendar information provided in the data store(s), the calendar information identifying at least one scheduled event that specifies the user as an attendee; and logic configured to provide directions to the destination(s), to provide unfiltered direction information. The device(s) also includes: a filtering component that is configured to filter the unfiltered direction information with respect to restriction information provided in the data store(s), to produce filtered direction information; a composing component that is configured to compose sign information based on the filtered direction information; and a delivery component that is configured to send the sign information to the electronic sign for presentation by the electronic sign.

According to a sixteenth aspect, the information gathering component is configured to determine the destination(s) by: identifying a scheduled event that the user is scheduled to attend; specifying a destination that corresponds to a location at which the scheduled event will take place; determining an amount of time between a current time and a time at which the scheduled event is to commence; identifying habit information that identifies one or more habits of the user; and selecting at least one additional destination based on the amount of time and the habit information.

According to a seventeenth aspect, the information gathering component further includes: logic configured to determine a degree of familiarity of the user with the environment; and logic configured to determine a level of specificity at which directions are to be provided based the degree of familiarity.

According to an eighteenth aspect, the restriction information used by the filtering component includes: user policy information, provided in the data store(s), which indicates a user-specific policy of the user with respect to presentation of information on the electronic sign; and/or organization policy information, provided in the data store(s), which indicates an organization-specific policy of an organization with respect to the presentation of information on the electronic sign; and/or co-viewer information which indicates whether there is any other user that is within the prescribed proximity to the electronic sign at a current time.

According to a nineteenth aspect, the filtered direction information identifies a subset of attendees who have already arrived at a location at which the scheduled event is to take place. The computing device(s) include a notification component that is configured to notify other attendees of the scheduled event of a current status of the user.

According to a twentieth aspect, a computer-readable storage medium is described for storing computer-readable instructions. The computer-readable instructions, when executed by one or more processor devices, perform a method that includes: determining that a user is within a prescribed proximity to an electronic sign, or will be in prescribed proximity to the electronic sign, based on sensor information provided by one or more sensors within an environment; determining whether there are any other users also within the prescribed proximity to the electronic sign based on the sensor information; determining an identity of the user; and determining at least one destination of the user. The determination operation is based at least on: calendar information provided in at least one data store, the calendar information identifying at least one scheduled event that specifies the user as an attendee; and/or habit information provided in the data store(s) that identifies one or more habits of the user. The method further includes: providing directions to the destination(s), to provide unfiltered direction information; and filtering the unfiltered direction information with respect to restriction information provided in the data store(s), to produce filtered direction information. The restriction information includes: user policy information which indicates a user-specific policy of the user with respect to presentation of information on the electronic sign; and/or organization policy information which indicates an organization-specific policy of an organization with respect to the presentation of information on the electronic sign; and/or co-viewer information which indicates whether there is any other user that is within the prescribed proximity to the electronic sign at a current time. The method further includes: composing sign information based on the filtered direction information; and sending the sign information to the electronic sign for presentation by the electronic sign.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   determining that a first user is within a prescribed proximity to a particular electronic sign based at least on a particular sign-specific code received from a first user device of the first user, the particular sign-specific code being associated with the particular electronic sign and selected from a plurality of different sign-specific codes associated with a plurality of different electronic signs provided in an environment;
   determining a first user-specific destination of the first user based at least on information provided in at least one data store;
   providing directions to the first user-specific destination as first direction information;
   composing first user-specific sign information based at least on the first direction information; and
   after detecting that the first user is within the prescribed proximity to the particular electronic sign:
   sending the first user-specific sign information to the particular electronic sign for presentation by the particular electronic sign; and
   sending a notification to another user device indicating that the first user is in a vicinity of the particular electronic sign,
   the first user-specific sign information and the notification being sent over a communication conduit.

2. The method of claim 1, further comprising:
   detecting that the first user and a second user are concurrently gazing at the particular electronic sign; and
   responsive to detecting that the first user and the second user are concurrently gazing at the particular electronic sign:
   displaying the first user-specific sign information to the first user on the particular electronic sign to guide the first user to the first user-specific destination; and
   displaying second user-specific sign information on the particular electronic sign to guide the second user to a second user-specific destination,
   the first user-specific sign information being displayed on the particular electronic sign concurrently with, and adjacent to, the second user-specific sign information.

3. The method of claim 2, further comprising:
   identifying the first user-specific destination as a first location of a first scheduled event that the first user is scheduled to attend based at least on calendar information provided in the at least one data store, the calendar information identifying the first user as an attendee of the first scheduled event; and
   identifying the second user-specific destination as a second location of a second scheduled event that the second user is scheduled to attend based at least on the calendar information provided in the at least one data store, the calendar information identifying the second user as an attendee of the second scheduled event.

4. The method of claim 1, further comprising:
   in an instance when the first user and a second user are concurrently gazing at the particular electronic sign:
   displaying a first user identifier of the first user, directions to the first user-specific destination, and an indication of one or more other attendees of a first scheduled event that are already present at the first user-specific destination in a first portion of the particular electronic sign; and
   displaying a second user identifier of the second user, directions to a second user-specific destination, and an indication of one or more other attendees of a second scheduled event that are already present at the second user-specific destination in a second portion of the particular electronic sign that is adjacent to the first portion.

5. The method of claim 1, further comprising:
   associating a plurality of different beacons with the plurality of different electronic signs; and
   assigning the plurality of different sign-specific codes to the plurality of different beacons, wherein respective sign-specific codes identify respective electronic signs that are associated with respective beacons,
   wherein the particular sign-specific code received from the first user device was emitted by a particular beacon that is associated with the particular electronic sign.

6. The method of claim 5, performed by a server computing device by sending encrypted communications to a plurality of different addresses associated with the plurality of different electronic signs, each electronic sign having a decryption key for decrypting the encrypted communications.

7. The method of claim 1, wherein the communication conduit comprises a wide area network or a local area network.

8. The method of claim 1, further comprising:
identifying multiple different routes to the first user-specific destination;
based at least on a travel constraint associated with the first user, selecting a particular route to the first user-specific destination that takes into account the travel constraint; and
composing the first user-specific sign information to direct the first user along the particular route.

9. The method of claim 1, further comprising:
identifying multiple different routes to the first user-specific destination;
based at least on a security restriction indicating that the first user is not permitted in a restricted part of a building, selecting a particular route to the first user-specific destination that does not require the first user to travel through the restricted part of the building; and
composing the first user-specific sign information to direct the first user along the particular route.

10. The method of claim 1, further comprising:
detecting that the first user has lingered within a predetermined proximity of the particular electronic sign for more than a prescribed amount of time; and
responsive to detecting that the first user has lingered within the predetermined proximity of the particular electronic sign for more than the prescribed amount of time, sending the first user-specific sign information to the particular electronic sign for presentation by the particular electronic sign.

11. The method of claim 1, further comprising:
accessing a rule associated with the first user that identifies whether the first user's name is to be displayed in certain buildings;
in first instances when the particular electronic sign is located in a building where the rule permits displaying the first user's name, including the first user's name in the first user-specific sign information; and
in second instances when the particular electronic sign is located in a building where the rule prohibits displaying the first user's name, excluding the first user's name from the first user-specific sign information.

12. The method of claim 1, wherein the first user-specific sign information directs the first user along a route to the first user-specific destination that comes within proximity to a plurality of other electronic signs on which further directions to the first user-specific destination are displayed as the first user gazes at the plurality of other electronic signs.

13. The method of claim 1, further comprising sending supplemental direction information to the first user device, the supplemental direction information directing the first user along a route to the first user-specific destination.

14. The method of claim 1, further comprising:
detecting, on a particular occasion, that no user who is unfamiliar with the environment is within the prescribed proximity to the particular electronic sign;
determining at least one default destination based on at least one contextual factor;
providing directions to said at least one default destination, to provide default direction information;
composing default sign information based at least on the default direction information; and
sending the default sign information to the particular electronic sign for presentation by the particular electronic sign.

15. One or more computing devices comprising:
a processing device;
at least one data store that provides user information regarding a plurality of users; and
a storage resource storing machine-readable instructions which, when executed by the processing device, cause the processing device to:
for a particular user that is deemed to be unfamiliar with an environment in which a particular electronic sign is located:
determine that the particular user is within a prescribed proximity to the particular electronic sign;
determine a particular destination of the particular user based at least the user information in said at least one data store;
provide directions to the particular destination to provide particular direction information;
compose particular sign information based at least on the particular direction information; and
cause the particular electronic sign to present the particular sign information to the particular user; and
for another user that is deemed to be familiar with the environment in which the particular sign is located:
determine at least one default destination associated with the particular electronic sign;
provide directions to said at least one default destination to provide default direction information;
compose default sign information, the default sign information providing directions to the at least one default destination based at least on the default direction information; and
cause the particular electronic sign to present the default sign information.

16. The one or more computing devices of claim 15, wherein the machine-readable instructions, when executed by the processing device, cause the processing device to:
identify a scheduled event that the particular user is scheduled to attend;
specify another destination that corresponds to a location at which the scheduled event will take place;
determine an amount of time between a current time and a time at which the scheduled event is to commence;
identify habit information in the at least one data store that identifies past routes taken by the particular user within proximity to the particular electronic sign;
select at least one additional destination based at least on the amount of time and the habit information; and
include additional directions to the at least one additional destination in the particular sign information that is displayed on the particular electronic sign.

17. The one or more computing devices of claim 15, wherein the machine-readable instructions, when executed by the processing device, cause the processing device to:
determine respective degrees of familiarity with the environment for the particular user and the another user.

18. The one or more computing devices of claim 15, wherein the particular sign information is user-specific and includes an avatar that identifies the particular user and that is displayed on the particular electronic sign concurrently with directions to the at particular destination of the particular user.

19. The one or more computing devices of claim 15, wherein the machine-readable instructions, when executed by the processing device, cause the processing device to:
detect a crowd of users approaching the particular electronic sign;

based on one or more criteria, select a prescribed subset of the users of the crowd;

generate other direction information for the prescribed subset of the users, the other direction information directing the prescribed subset of the users to one or more other destinations; and cause the particular electronic sign to display the other direction information.

20. A computer-readable storage medium storing computer-readable instructions which, when executed by one or more processing devices, cause the one or more processing devices to perform acts comprising:

determining that a first user is within a prescribed proximity to a particular electronic sign based at least on a particular sign-specific code received from a first user device of the first user, the particular sign-specific code being associated with the particular electronic sign and selected from a plurality of sign-specific codes associated with a plurality of electronic signs;

determining a first user-specific destination of the first user based at least on information provided in at least one data store;

providing directions to the first user-specific destination as first direction information;

composing first user-specific sign information based at least on the first direction information; and after detecting that the first user is within the prescribed proximity to the particular electronic sign:

causing the particular electronic sign to display the first user-specific sign information; and sending a notification to another user device indicating that the first user is in a vicinity of the particular electronic sign.

* * * * *